US011805170B2

(12) United States Patent
Capps

(10) Patent No.: US 11,805,170 B2
(45) Date of Patent: Oct. 31, 2023

(54) FIRE SERVICE AND EQUIPMENT INSPECTION TEST AND MAINTENANCE SYSTEM

(71) Applicant: David Sean Capps, San Diego, CA (US)

(72) Inventor: David Sean Capps, San Diego, CA (US)

( * ) Notice: Subject to any disclaimer, the term of this patent is extended or adjusted under 35 U.S.C. 154(b) by 0 days.

(21) Appl. No.: 14/880,209

(22) Filed: Oct. 10, 2015

(65) Prior Publication Data

US 2017/0104823 A1  Apr. 13, 2017

(51) Int. Cl.
*H04L 67/1097* (2022.01)
*A62C 37/50* (2006.01)
(Continued)

(52) U.S. Cl.
CPC .......... *H04L 67/1097* (2013.01); *A62C 37/50* (2013.01); *G06F 16/18* (2019.01);
(Continued)

(58) Field of Classification Search
CPC ................................ H04L 67/10; A62C 37/50
See application file for complete search history.

(56) References Cited

U.S. PATENT DOCUMENTS

| 6,675,091 B2 * | 1/2004 | Navab | G01C 21/206 701/515 |
| 7,483,917 B2 * | 1/2009 | Sullivan | G06F 16/29 707/999.102 |

(Continued)

FOREIGN PATENT DOCUMENTS

WO    WO-2009105603 A1 *   8/2009   ............. G08B 25/14

*Primary Examiner* — Lashonda Jacobs-Burton
(74) *Attorney, Agent, or Firm* — Robert Cantrell; Jose W. Jimenez; Jimenez Law Firm

(57) ABSTRACT

A system for documenting, monitoring, testing, inspecting and maintaining fire equipment located at the property of secondary customers. Secondary customers include people, organizations and properties. The system saves all information collected on a server computer accessible via a computer network. This information is reviewable and editable by primary customers. In a preferred embodiment the server computer is located in the cloud and the computer network is the Internet. In a preferred embodiment, primary customers include fire inspection/repair/monitoring companies and fire departments using mobile computer devices. In another preferred embodiment, the software application has a customer relationship management tool allowing fire equipment, people, properties and organizations to be easily associated with one another. In another preferred embodiment, each piece of fire equipment is geographically mapped to a specific location via GPS or other mapping reference. Additionally, all fire equipment associated with a specific property, building or floor has all relevant information digitally captured and recorded into the cloud database. In another preferred embodiment, a fire department accesses fire equipment information during an exercise or emergency to direct responders. In another preferred embodiment, secondary customers with authorized access receive data and information regarding the status of the fire safety equipment, and receive analysis and recommendations from the service entities. Primary customers receive data and information regarding the status of fire safety equipment from the cloud database, and transmit analysis, records and recommendations to the secondary customers.

6 Claims, 36 Drawing Sheets

(51) Int. Cl.
*G06F 16/18* (2019.01)
*H04L 67/04* (2022.01)
*H04L 67/10* (2022.01)
*H04L 67/125* (2022.01)
*H04L 67/52* (2022.01)

(52) U.S. Cl.
CPC .............. *H04L 67/04* (2013.01); *H04L 67/10* (2013.01); *H04L 67/125* (2013.01); *H04L 67/52* (2022.05)

(56) References Cited

U.S. PATENT DOCUMENTS

| | | | | |
|---|---|---|---|---|
| 7,649,450 | B2 * | 1/2010 | Campion, Jr. | G08B 29/145 340/506 |
| 7,832,638 | B2 * | 11/2010 | Wetzel | G07C 1/20 235/385 |
| 7,924,149 | B2 * | 4/2011 | Mendelson | G06Q 90/20 340/572.1 |
| 8,059,151 | B2 * | 11/2011 | Ersue | G01N 21/9515 348/86 |
| 8,210,047 | B2 * | 7/2012 | McSheffrey, Jr. | A62C 37/50 73/753 |
| 8,271,321 | B1 * | 9/2012 | Kestenbaum | G06Q 10/10 705/14.1 |
| 8,311,510 | B2 * | 11/2012 | Cradick | H04W 76/50 340/531 |
| 8,538,687 | B2 * | 9/2013 | Plocher | G01C 21/20 701/434 |
| 8,706,718 | B2 * | 4/2014 | Gerstner | G06F 16/29 707/723 |
| 8,810,387 | B2 * | 8/2014 | Hall | G08B 29/12 340/508 |
| 8,842,016 | B1 * | 9/2014 | Cazanas | A62C 37/50 42/70.07 |
| 9,041,534 | B2 * | 5/2015 | McSheffrey | A62C 13/76 340/286.07 |
| 9,467,662 | B2 * | 10/2016 | Childers | H04N 7/181 |
| 9,552,720 | B2 * | 1/2017 | Moffa | G08B 25/14 |
| 9,672,486 | B1 * | 6/2017 | Turpin | G01N 21/8851 |
| 9,767,679 | B2 * | 9/2017 | Piccolo, III | G08B 29/145 |
| 10,048,077 | B2 * | 8/2018 | Direkwut | G01C 21/3852 |
| 10,097,982 | B2 * | 10/2018 | Kwan | H04W 76/14 |
| 10,216,164 | B2 * | 2/2019 | Brown | G08B 29/145 |
| 11,126,966 | B2 * | 9/2021 | Moren | G06Q 30/018 |
| 2003/0065522 | A1 * | 4/2003 | Wepfer | G06Q 10/0875 705/29 |
| 2003/0116329 | A1 * | 6/2003 | McSheffrey | A62C 13/76 169/30 |
| 2004/0065451 | A1 * | 4/2004 | McSheffrey | A62C 37/50 169/30 |
| 2005/0006109 | A1 * | 1/2005 | McSheffrey | A62C 13/76 340/531 |
| 2005/0108038 | A1 * | 5/2005 | Cober | G06Q 90/205 705/324 |
| 2006/0108241 | A1 * | 5/2006 | Smith | A62B 99/00 206/214 |
| 2007/0208438 | A1 * | 9/2007 | El-Mankabady | G05B 15/02 700/83 |
| 2007/0219645 | A1 * | 9/2007 | Thomas | G05B 15/02 700/29 |
| 2008/0021718 | A1 * | 1/2008 | Kaartinen | G06Q 50/265 705/325 |
| 2008/0071392 | A1 * | 3/2008 | Brown | G05B 15/02 700/23 |
| 2008/0084291 | A1 * | 4/2008 | Campion | G08B 29/145 340/514 |
| 2008/0314681 | A1 * | 12/2008 | Patel | A62B 3/00 182/18 |
| 2009/0319180 | A1 * | 12/2009 | Robinson | G06Q 10/10 701/532 |
| 2010/0153168 | A1 * | 6/2010 | York | G06Q 10/0637 705/28 |
| 2010/0174974 | A1 * | 7/2010 | Brisebois | G06Q 10/00 715/780 |
| 2010/0185549 | A1 * | 7/2010 | York | G06Q 10/0637 705/317 |
| 2012/0065944 | A1 * | 3/2012 | Nielsen | G06Q 50/06 703/1 |
| 2012/0154141 | A1 * | 6/2012 | Piccolo, III | G08B 25/10 340/539.11 |
| 2012/0188076 | A1 * | 7/2012 | McSheffrey | F17C 13/02 340/539.17 |
| 2012/0260313 | A1 * | 10/2012 | Gomez | H04L 63/08 707/E17.032 |
| 2012/0320058 | A1 * | 12/2012 | Stephen | G06T 15/20 345/428 |
| 2013/0176124 | A1 * | 7/2013 | Brinton | G07C 5/008 340/539.13 |
| 2013/0262497 | A1 * | 10/2013 | Case | H04L 67/01 715/224 |
| 2014/0032433 | A1 * | 1/2014 | Eick | G06Q 10/10 705/314 |
| 2014/0130140 | A1 * | 5/2014 | Abhyanker | G06Q 30/02 726/4 |
| 2014/0243036 | A1 * | 8/2014 | Kouwe | H04M 11/04 455/521 |
| 2014/0258825 | A1 * | 9/2014 | Ghosh | G06V 30/40 715/222 |
| 2014/0331176 | A1 * | 11/2014 | Cheng | G09B 29/106 715/808 |
| 2015/0002290 | A1 * | 1/2015 | Wang | G08B 29/043 340/506 |
| 2015/0335927 | A1 * | 11/2015 | McManama | A62C 37/50 340/691.8 |
| 2017/0004427 | A1 * | 1/2017 | Bruchal | G06Q 10/06311 |
| 2017/0104823 | A1 * | 4/2017 | Capps | H04L 67/52 |
| 2021/0287318 | A1 * | 9/2021 | Sterpin | H04W 4/33 |

\* cited by examiner

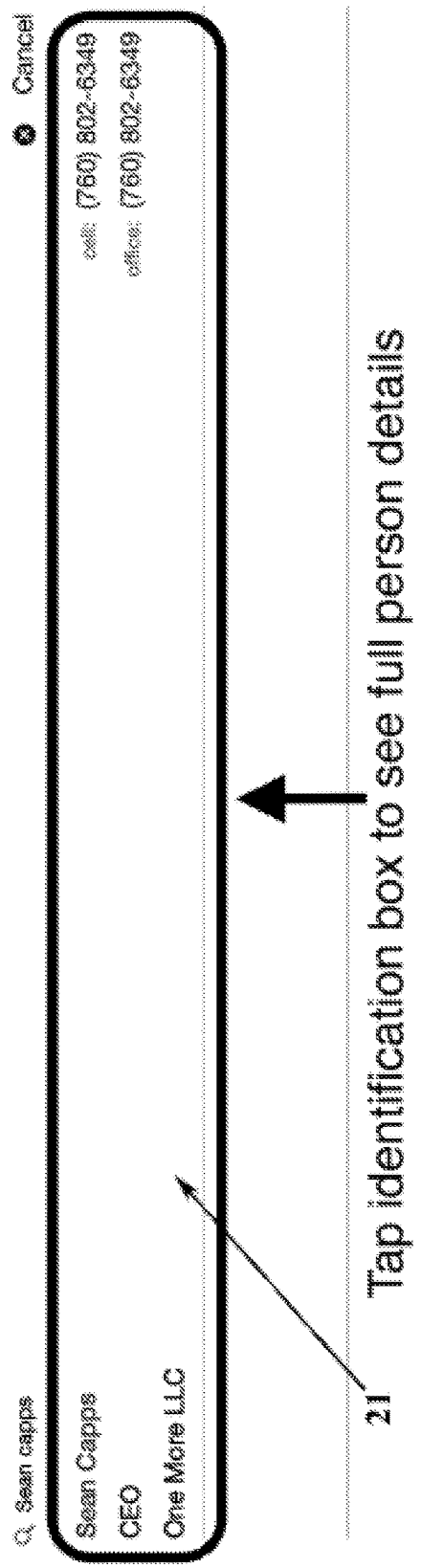
FIG. 2

FIG. 11

Properties

8880 Recho Rd • San Diego • CA • 92121 — Map 3888 genesee ave • San Diego • CA • 92111 — Map Map SDSU
5500 Campanile Dr. • San Diego • CA • 92182 — Map 5005 Texas st
5005 Texas st • San Diego • CA • 92108 — Map 6034 & 6024 kantor st
6034 kantor st • San Diego • CA • 92122 — Map A - Ozate Office (San Juan Capistrano)
501 Rio Street • San Juan Capistrano • CA • 92675 — Map Ageia
910 N Pacific Street • Oceanside • CA • 92054 — Map ARO Partners
2232 Versus St • San Diego • CA • 92154 — Map Cal Energy
7030 gentry rd. • Calipatria • CA • 92233 — Map 12t People   Orgs   Properties

| | |
|---|---|
| Date: 3/23/15<br>PWIP<br>c/o Phase 3 Properties Inc.<br>PO BOX 927729<br>San Diego, CA 92192 | Salesmen: Sean Capps   proposal # 1141<br>Contact: Corrine Gulutz<br>Tel: 858-546-0888<br>Email: gulutz@phase3properties.com<br>gulutz@p3re.com<br>Work address: 315-325 Weakley Road &<br>2361-2365 Portico Blvd, Calexico, CA |

We are pleased to provide our price to perform the following scope of work, please select from the following options:

☐ NovaMex required repairs $2,170.00
☐ NovaMex required and recommended repairs $4,460.00

☐ Spreckles required repairs $3,187.00
☐ Spreckles required and recommended repairs $4,482.00

☐ Clover required repairs $3,146.00

☐ Fire Pump Room required repairs $2,642.00

SCOPE OF WORK –
- Provide tools, material and labor to perform repairs from 5 year inspection dated 3-4-15.

INCLUSIONS –
1. All labor and equipment to perform the repairs listed above.
2. Lift (for recommended repairs).

EXCLUSIONS –
1. Containment, filtering or off-site disposal of water discharge or drained from the fire sprinkler system(s) including any costs or fines associated with such.
2. Paint, patch or repair due to installation.
3. Modifications or upgrades to existing system.
4. Hydraulic calculations.
5. PIV repairs exclude replacement parts and underground excavation. Repair existing only- deep lube service.

QUALIFICATIONS –
1. All work to be completed during normal business hours M-F 7AM to 3:30 PM
2. Net payment 30 days.
3. This proposal may be withdrawn if not accepted within 30 days.
4. Additional trip charges will apply if recommended repairs are completed separate from required repairs.

*If you wish to proceed with this proposal please sign, date and return.*

Sean Capps
Western Fire Protection Service

Acceptance : _____   _____
                        Signature                    Date
Print Name: _____

Western Fire Protection, Inc.

Page 1 of 2

FIG. 29

JOB NAME: PWIP
INSPECTION DATE: 3/4/15

JOB NUMBER: ITC-01007
INSPECTOR: Jack C. and Sean A.

| Location | Description |
|---|---|
| *Required repairs* | *$2,170.00* |
| 1  NovaMex - Warehouse | (4) - 1 1/2" Rack Hose are 2007 (1) 1 1/2" Rack Hose are 2004 |
| 2  NovaMex | System 2 Bell Doesn't ring |
| *Recommended repairs* | *Not required for certification* |
| 3  NovaMex - Warehouse Break Room & Storage Room | Add sprinkler head $995.00 |
| 4  NovaMex - Driver Check In | Add (2) sprinkler heads $1,295.00 |

| Location | Description |
|---|---|
| *Required repairs* | *$3,187.00* |
| 1  Spreckels - Warehouse | (7) 2007 1 1/2" Rack Hose |
| 2  Spreckels | (2) Bell signs missing |
| 3  Spreckels | System 2 PIV Frozen |
| *Recommended repairs* | *Not required for certification* |
| 4  Spreckels - Warehouse | Add (2) sprinkler heads $1,295.00 |

| Location | Description |
|---|---|
| *Required repairs* | *$3,146.00* |
| 1  Clover 325 Bldg | Office (6) 1/2" 155° QR SRC Globe |
| 2  Clover 325 Bldg - North end warehouse 1st&2nd Floor | (15) 1/2" 155° QR SRC Globe |
| 3  Clover 325 Bldg - Warehouse | (1) 1 1/2" Rack Hose 2007 SE Corner |
| 4  Clover 325 | Bell did not ring |
| 5  Clover 325 | PIV Frozen |
| 6  Clover 315 Bldg | (3) 1 1/2" Rack Hose 2007 |
| 7  Clover 315 Bldg - Lobby Mens Room | (1) 1/2" 155° QR SRC Viking Corroded |
| 8  Clover 315 | PIV Frozen |

| Location | Description |
|---|---|
| *Required repairs* | *$2,642.00* |
| 9  Fire Pump Room | 8" Butterfly Valve does not close all the way supply to 315 & 325 |

Western Fire Protection, Inc.

FIG. 30

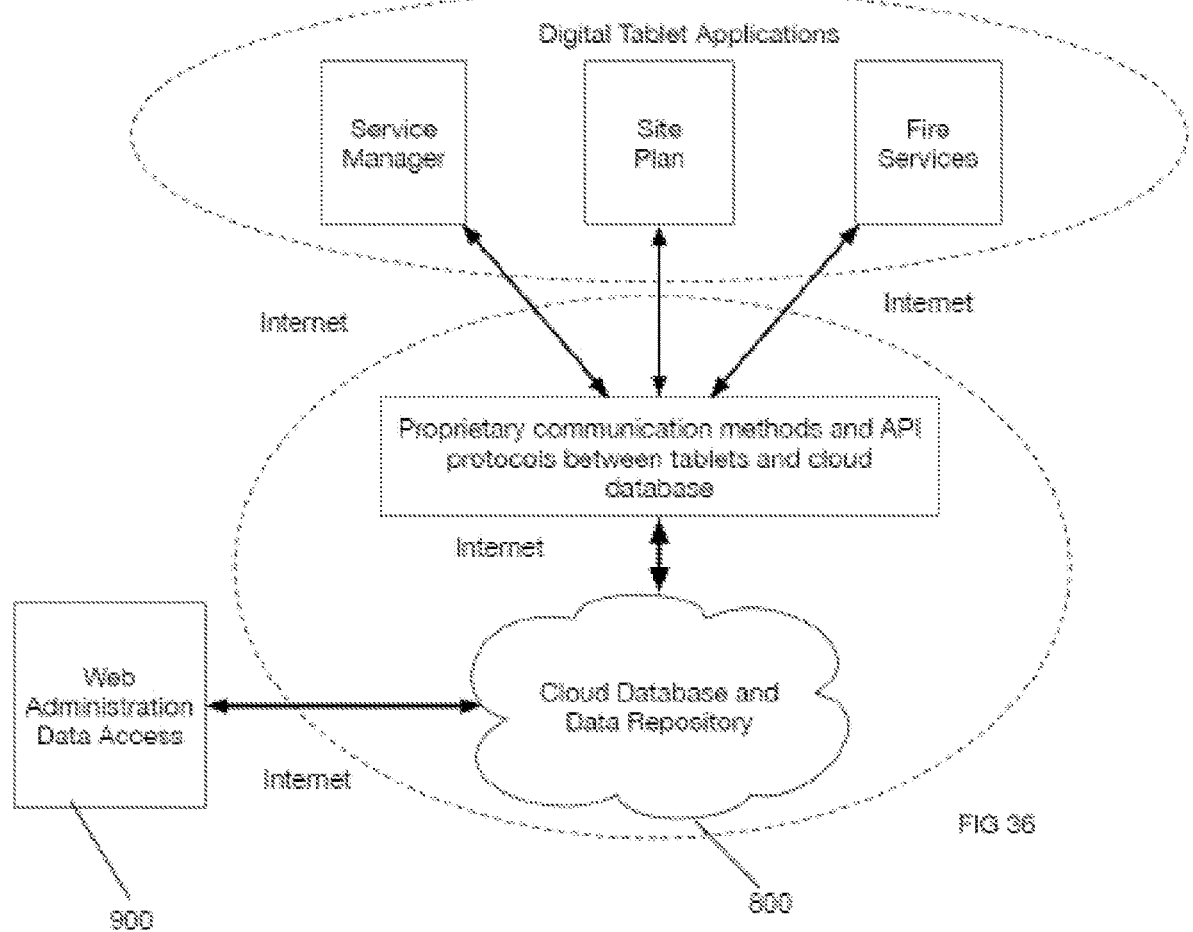

FIRE SERVICE AND EQUIPMENT INSPECTION TEST AND MAINTENANCE SYSTEM

The present invention relates to fire equipment, and in particular, to locations, mapping, and maintenance for fire equipment.

BACKGROUND OF THE INVENTION

As part of modern society buildings and structures are required to have fire equipment on the premises. Fire sprinkler systems, fire alarm systems, fire extinguishers and other fire safety equipment must be properly located and maintained. Business owners must be very careful to ensure that their equipment meets any legal obligations as well as obligations required by insurance companies. Often, business owners rely on fire service companies to conduct fire equipment inspections, advise the customer of any deficiencies and conduct repairs. Fire service companies have the expertise and the resources to effectively maintain multiple customers. However, as the number of customers increases and the amount of fire equipment increases it becomes more challenging to efficiently track and monitor everything required.

The Cloud

"The cloud" refers to software and services that run on Internet server computers and data stored on Internet server computers, instead of locally on an individual's personal computer. Most cloud services can be accessed through a Web browser like Firefox or Google Chrome, and some companies offer dedicated mobile apps.

Some examples of cloud services include Google Drive, Apple iCloud, Netflix, Yahoo Mail, Dropbox and Microsoft OneDrive. One advantage of the cloud is that the user can access his information on any device with an Internet connection. For example, the user can make edits to a file in Google Docs on his home computer, and then pick up where he left off at a different location on a different computer. Colleagues can even collaborate on the same document.

What is needed is an improved system, utilizing cloud technologies, allowing customers to connect with fire service companies so that the fire service companies can properly and efficiently advise and maintain its customers, properties, equipment and the inspection test and maintenance process.

SUMMARY OF THE INVENTION

The present invention provides a system for monitoring, testing, inspecting and maintaining fire equipment located at the property of secondary customers. Secondary customers include people, organizations and properties. The system saves all information collected on a server computer accessible via a computer network. This information is reviewable and editable by primary customers. In a preferred embodiment the server computer is located in the cloud and the computer network is the Internet. In a preferred embodiment, primary customers include fire inspection/repair/monitoring companies and fire departments using mobile computer devices. In another preferred embodiment, the software application has a customer relationship management tool allowing fire equipment, people, properties and organizations to be easily associated with one another. In another preferred embodiment, each piece of fire equipment is geographically mapped to a specific location via GPS or other mapping reference. Additionally, all fire equipment associated with a specific property, building or floor has all relevant information digitally captured and recorded into the cloud database. In another preferred embodiment, a fire department accesses fire equipment information during an exercise or emergency to direct responders. In another preferred embodiment, secondary customers with authorized access receive data and information regarding the status of the fire safety equipment, and receive analysis and recommendations from the service entities. Primary customers receive data and information regarding the status of fire safety equipment from the cloud database, and transmit analysis, records and recommendations to the secondary customers.

BRIEF DESCRIPTION OF THE DRAWINGS

FIGS. 1-7 show preferred screens for viewing and editing people.

FIGS. 8-11 show preferred screens for viewing and editing organizations.

FIGS. 12-14 show preferred screens for viewing and editing properties.

FIGS. 29-30 show a preferred proposal.

FIG. 36 shows preferred connectivity.

DETAILED DESCRIPTION OF THE PREFERRED EMBODIMENTS

Figure 33:
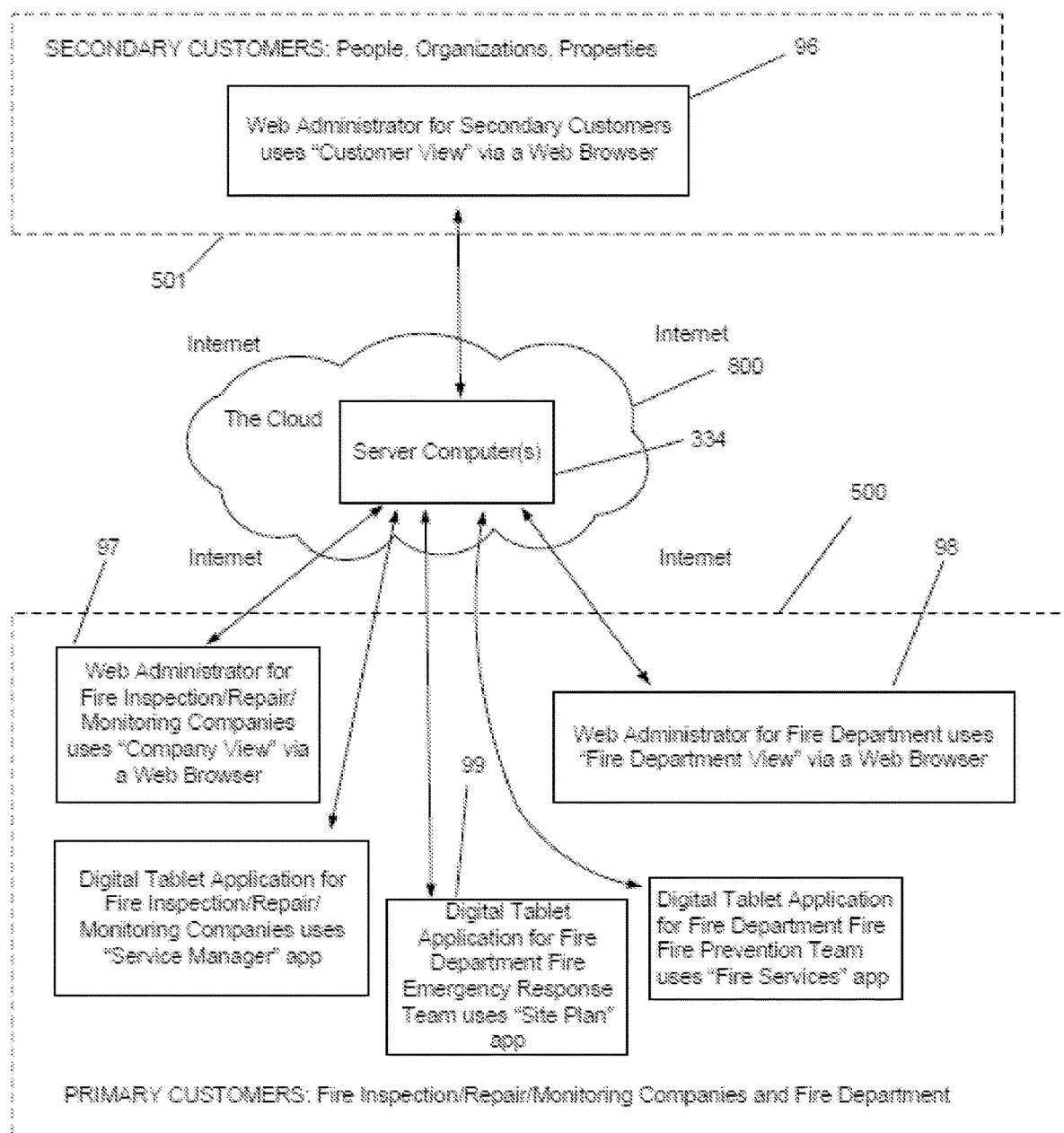
FIG. 33 shows preferred connectivity.
Figure 35A:
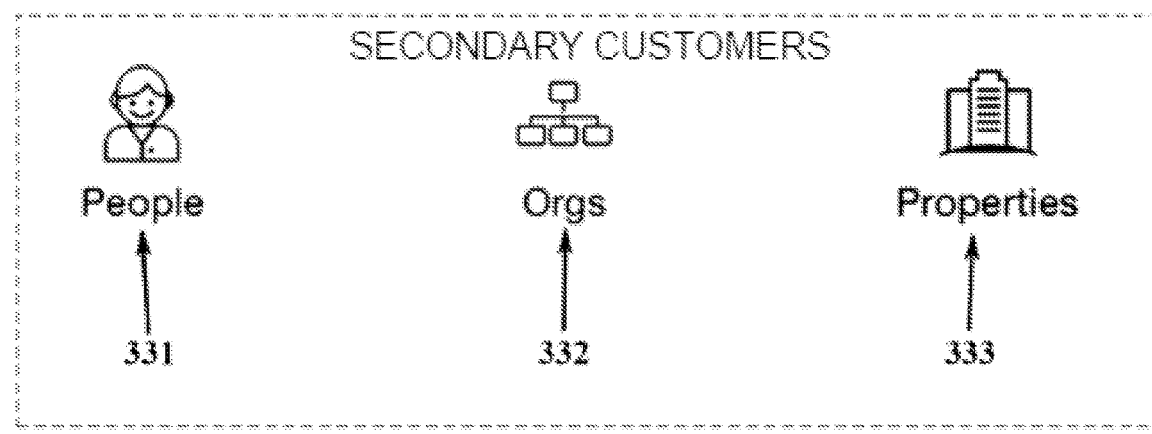
FIGS. 35A-35B show preferred secondary customers and primary customers.
Figure 35B:
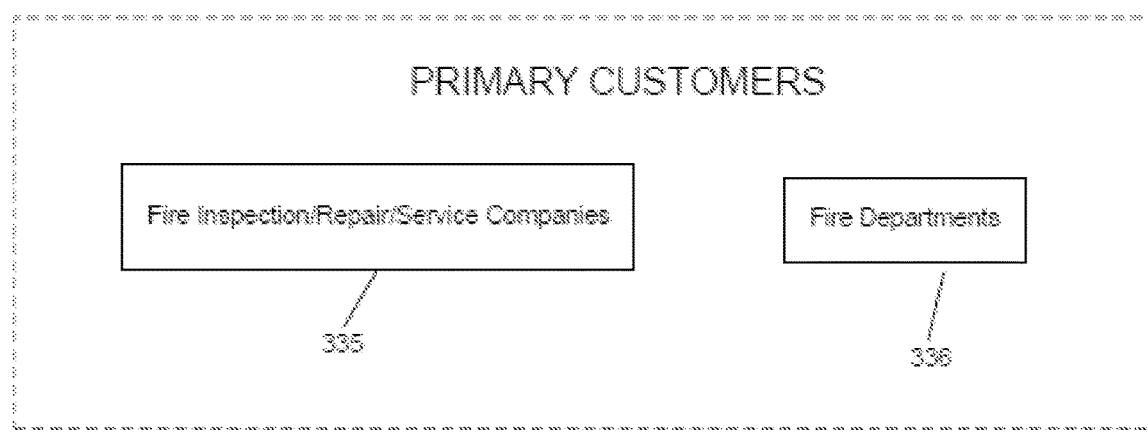

FIG. 33 shows a block diagram illustrating preferred connectivity of the present invention. In a preferred embodiment, information regarding secondary customers 501 is uploaded to central cloud database 800 having server computers 334. Secondary customers 501 include people 331, organizations 332 and properties 333 (FIG. 35A). Primary customers 500 are then able to access this uploaded information. Primary customers 500 include fire inspection/repair/service companies 335 and fire departments 336 (FIG. 35B).

Figure 34:
FIG. 34 shows a preferred software application.

In a preferred embodiment, primary customers 500 have download application programming 341 (FIG. 34) via a computer network (such as the Internet). Primary customers 500 use the application to collect, store, view and access information from central cloud database 800. Secondary customers can view via web browser information about their particular property, buildings and safety equipment. This allows the secondary customer's computers to connect via the Internet to their relevant information regarding their specific information properties, building and able to view reports, budgets, and other relevant information. All connected entities may then access the uploaded information that it is accessible on cloud server 800 and connect with each other as shown.

In a preferred embodiment software applications programming 341 is downloaded to mobile computer devices. (for example the iPad made by Apple Computers). Other computers that are programmed utilizing app 341 include: programmable smartphones, laptop computers, desktop personal computers, and other programmable devices capable of connecting to a computer network. App 341 allows the primary customers 500 to access listings of people, organizations and properties that have had their identifying information entered into a database on cloud server 800. A primary customer can also view maps and photographs of properties in the database. A primary customer can ascertain the location of fire equipment at the properties. Fire safety inspections can be planned, assigned and conducted at the properties. Inspection reports and deficiency lists can be generated. Service and repair companies can view the reports and generate sales proposals for consideration by the customers. During the repair process the service and repair companies can update the repair progress immediately as repairs are made. Likewise the secondary customers can view the repairs as they occur. Upon completion of the repairs, the primary customer's accounting department can generate bills that are transmitted to the secondary customers.

Also, in a preferred embodiment, fire department 336 is able to view properties, people and organizations that have been uploaded to the database. In the event of a fire, the fire department can access maps that show the property of interest. The fire department will then immediately know available firefighting equipment and its exact location, its current operating condition and the last date it was inspected. With this information a fire marshal at the fire department can view the property and fire equipment at the property and use this information to more intelligently direct the actions of fire fighters at the scene.

More specific examples of the utilization of preferred embodiments of the present invention are provided below:

People

In a preferred embodiment of the present invention information on people is gathered and associated with organizations and properties that are related to the people.

Figure 1:
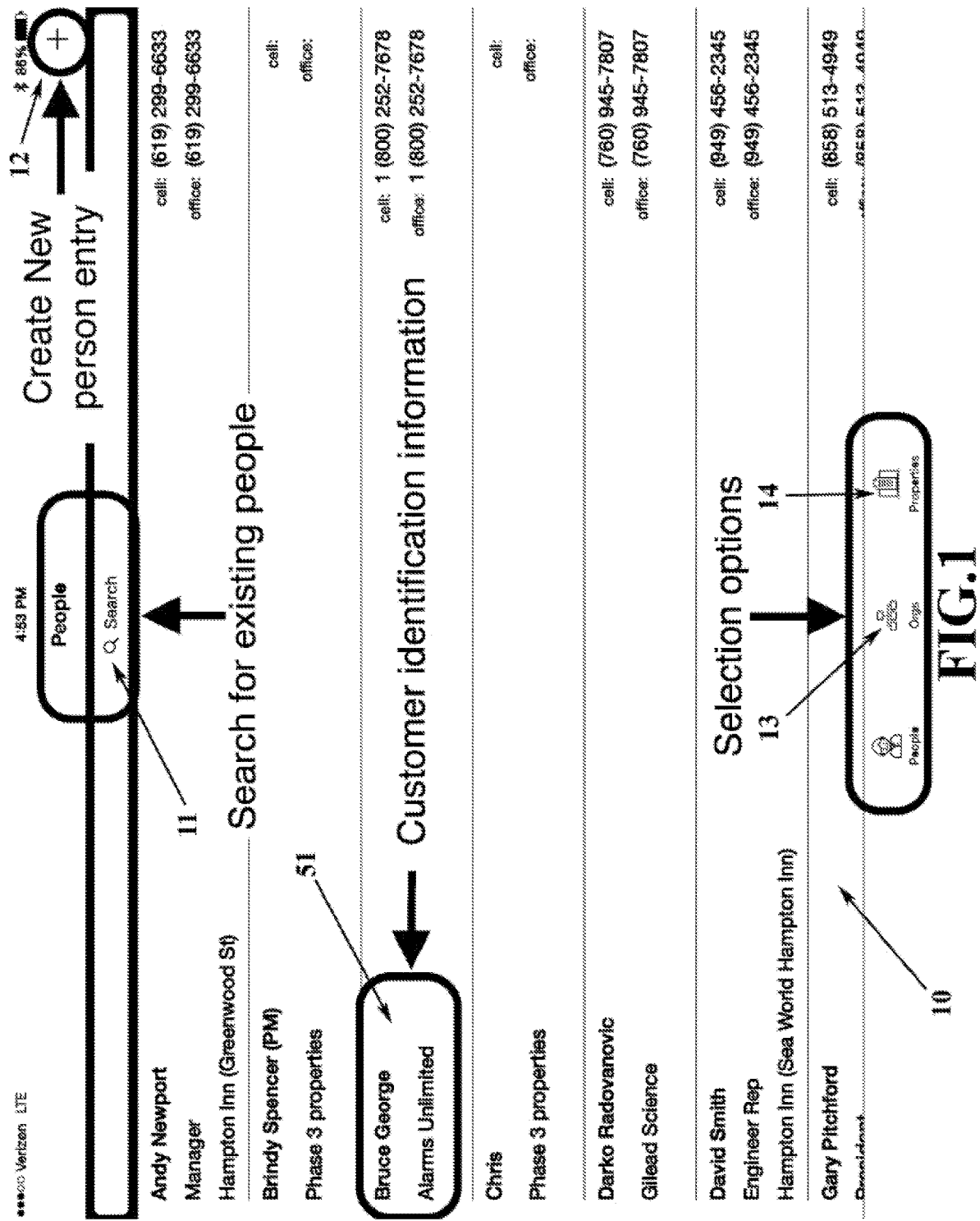

In FIG. 1, the user has app 341 installed on his programmable device. He has clicked on the People tab shown on the home page and has been brought to screen 10. People who have been entered into the database are listed alphabetically. From here the user can search for a specific person by clicking on search button 11. The user can also add a new person to the database by clicking on button 12. In FIG. 1, the user is viewing the People screen 10. The user can view the Organizations screen by clicking on button 13 or he can view the Properties screen by clicking on button 14.

Figure 3:

In FIG. 2 the user has scrolled down to person "Sean Capps". To access more information on Sean Capps, the user taps on identification box 21. In FIG. 3 the user has clicked on identification box 21 (FIG. 1) and more detailed information regarding Sean Capps is displayed.

Figure 4:
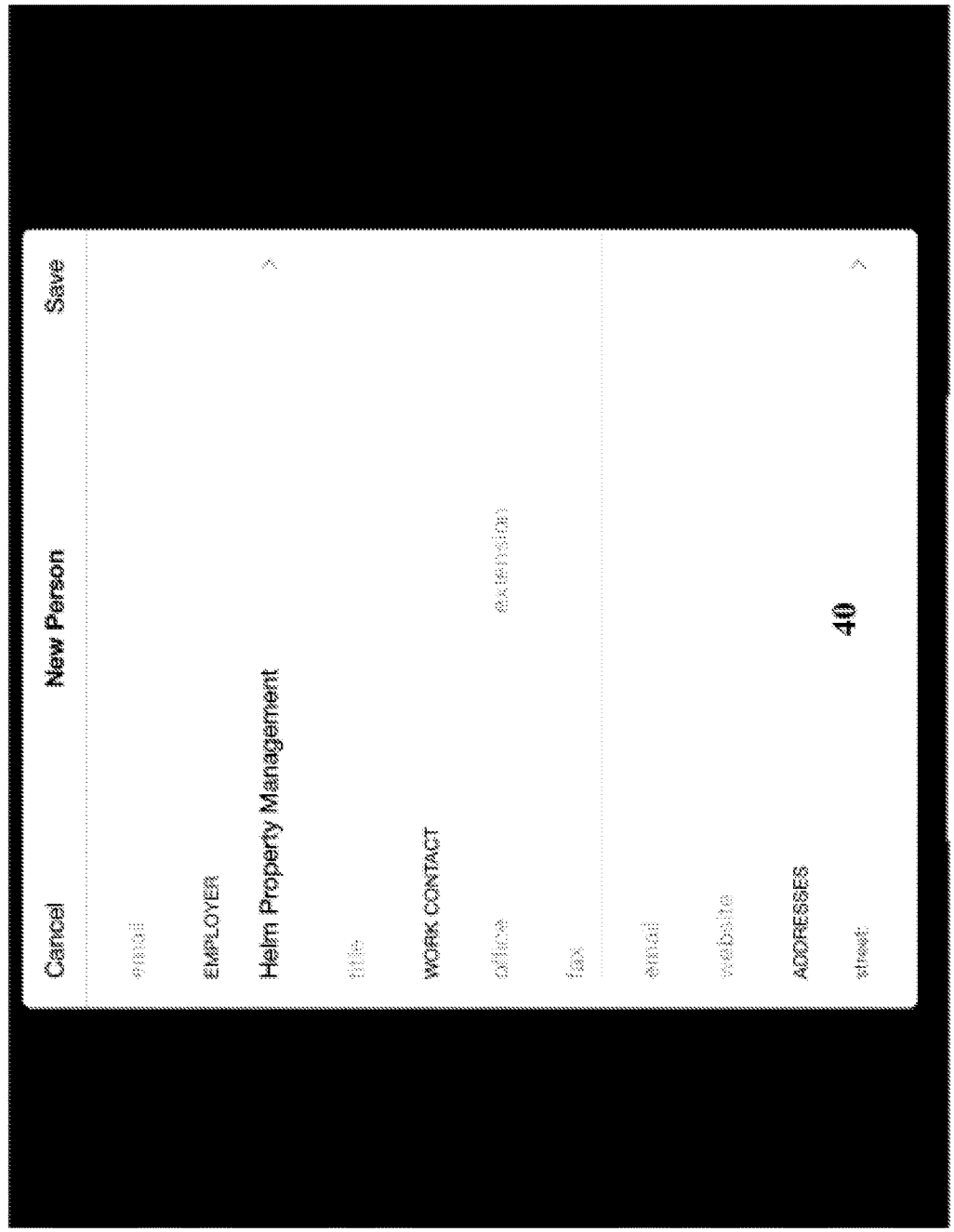

In FIG. 4 the user has clicked on button 12 (FIG. 1) to add a new person to the database and screen 40 is displayed. Information relating to the new person may be entered in the appropriate locations listed.

In FIG. 1 the user has clicked on button 51 for person "Bruce George" (FIG. 5) so that screen 50 is now displayed. The user can now edit or add more information. For example, the user can edit Bruce George information by clicking on button 52. The user can also add an employer organization for Bruce George by clicking on button 54. The user can view and access properties associated with Bruce George by viewing and clicking on section 55.

Figure 5:
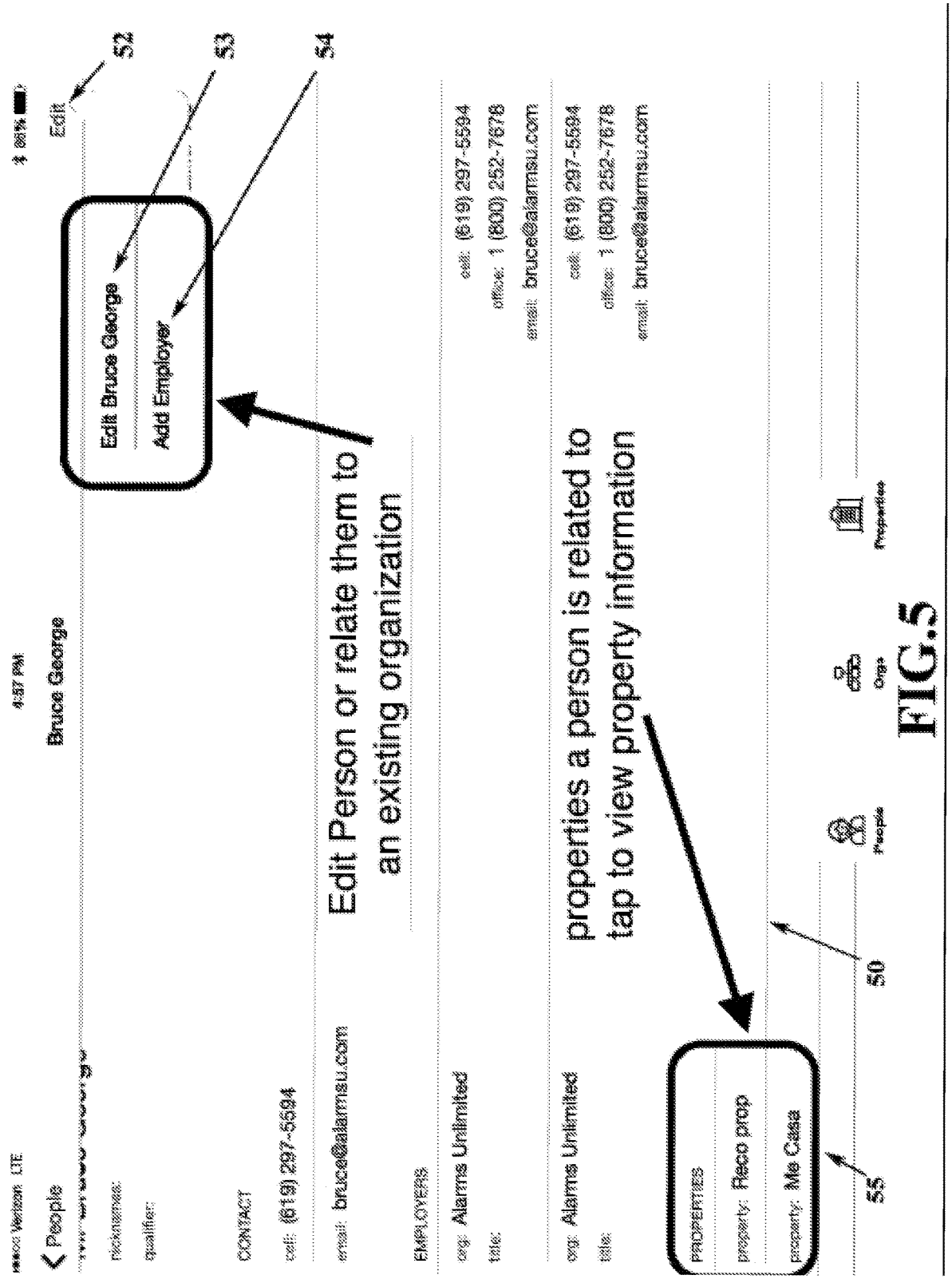
Figure 6:
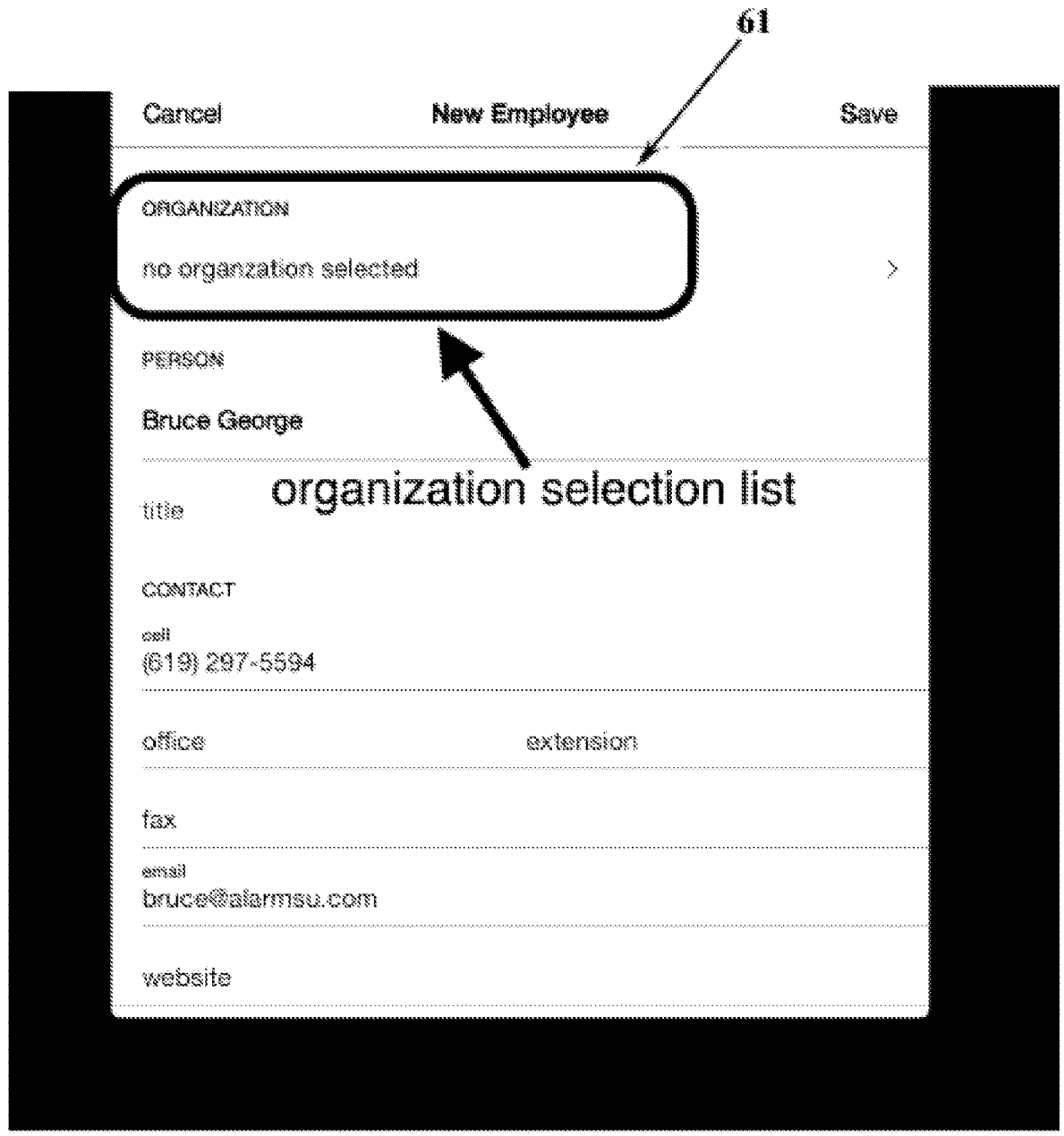
Figure 7:

In FIG. 5 the user has clicked on button 54 to add an employer. Screen 60 (FIG. 6) is then displayed. The user then clicks on section 61 to add an organization as an employer. This brings up screen 70 shown in FIG. 7. The user can add one of the organizations shown to person "Bruce George". Or the user can add a new organization to the list by clicking on button 71.

Organizations

Organizations are also related to properties tracked in the database. For example, a property will often have associated organizations, such as: alarm companies, property managers, owners, fire departments, and on-site contacts, as well as others.

All people associated with an organization are automatically listed under the organization's information and can be referenced in the organization windows.

All properties associated with an organization are also listed under organizations.

Figure 8:
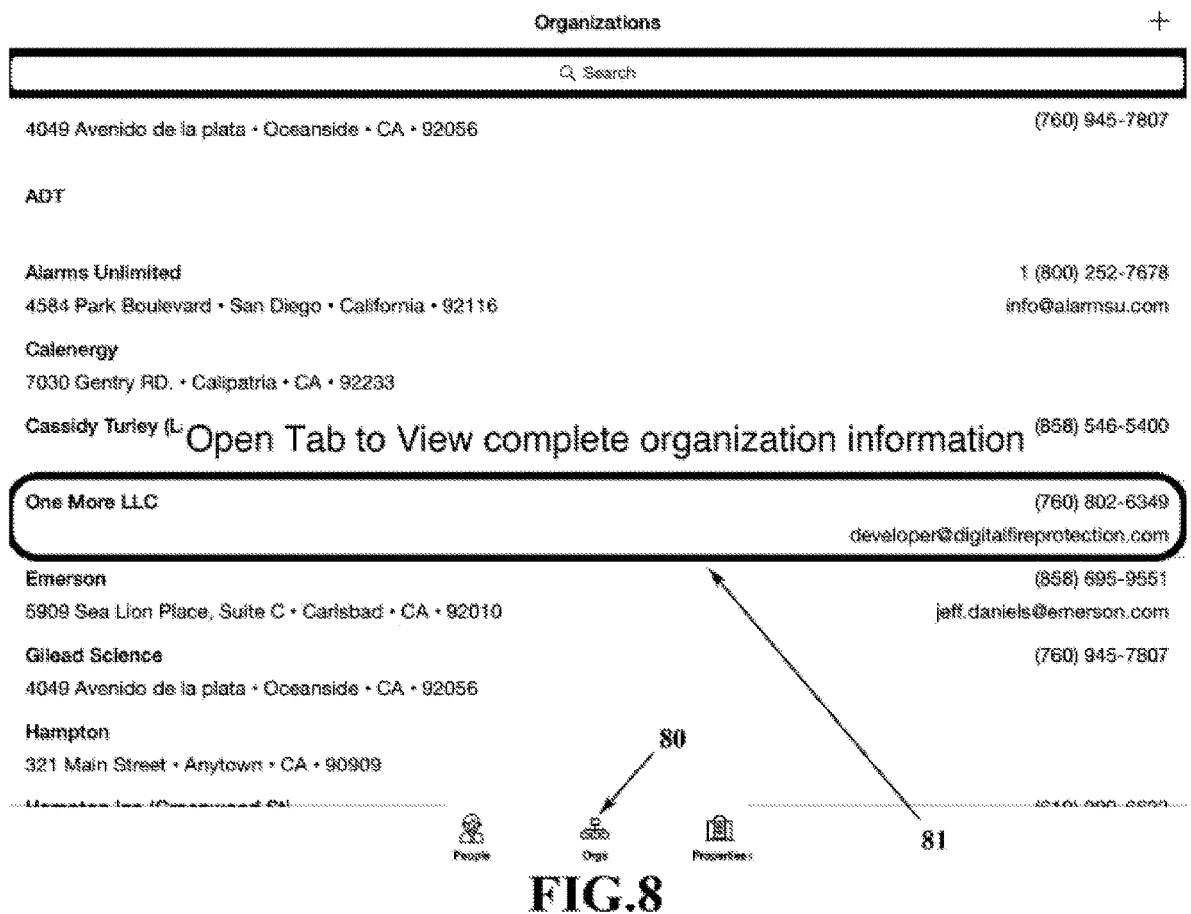

In FIG. 1 the user has clicked on button 13 causing screen 80 (FIG. 8) to be displayed. Screen 80 displays a list of organizations compiled within the database listed alphabetically. In FIG. 8, the user has clicked on section 81 for the organization "One More LLC" to access more detailed information regarding One More LLC.

Figure 9:

Screen 91 (FIG. 9) is then displayed. Here the user can view pertinent information regarding this organization. (i.e., contact information, employee lists, management, property listing, fire department, other).

Figure 10:
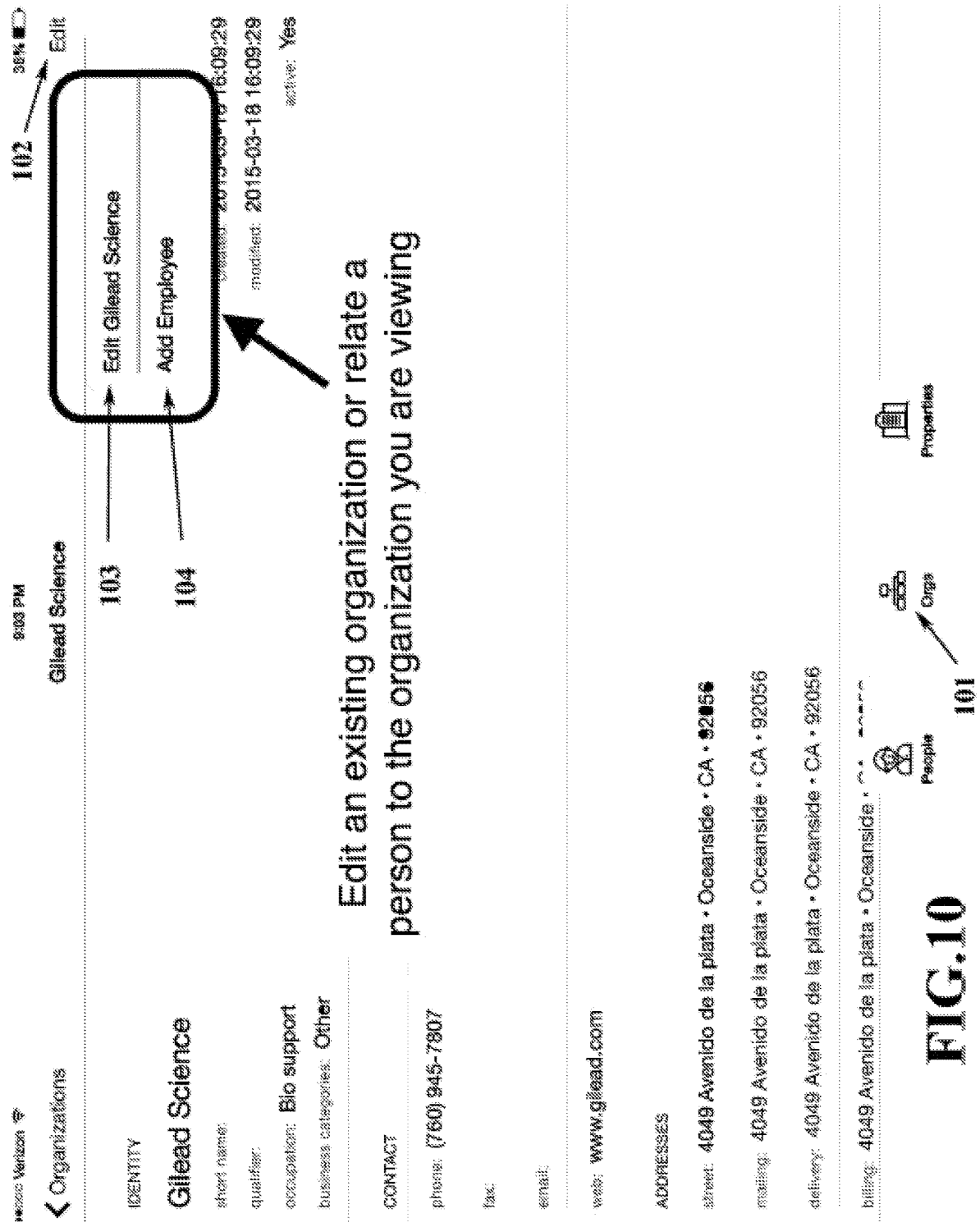

In FIG. 8, the user has clicked on section 82 for Gilead Science. This brings up the screen 101 (FIG. 10). Here the user may click on button 102 to either further edit the information for Gilead Science by clicking on button 103 or he may click on button 104 to add another employee for Gilead Science.

Figure 11:
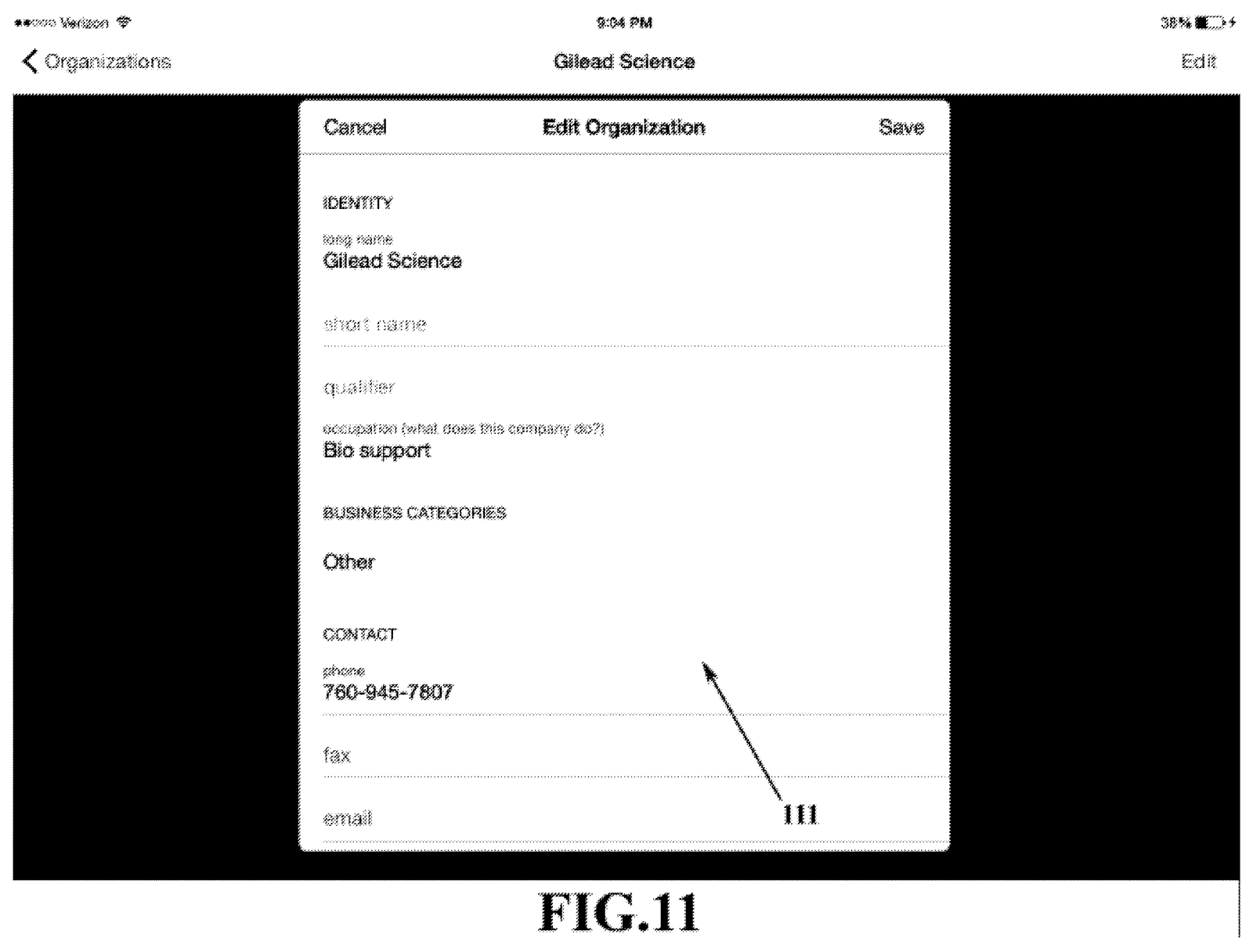

In FIG. 11 the user has clicked on button 102 (FIG. 10) to display pop-up section 111. Here the user can enter additional details regarding Gilead Science.

Properties

All properties are searchable by address, name, job number, building number and through associations with people or organizations. All properties show lists of associated people and organizations involved with the properties. The lists identify the associations with the properties.

Property levels are mapped via GPS and satellite images, represented by an icon, showing exact locations of all fire safety equipment both on the property level and floor levels.

Larger properties with multiple buildings sharing one individual address (such as hotels, college campus, etc.) have extra identifiers (pins) that can be labeled accordingly and set at a specific GPS locations. The building list shows at the property level, allowing the user to quickly find buildings and fire safety equipment for that building.

Figure 13:

In FIG. 1 the user has clicked on button 14 causing screen 120 (FIG. 12) to be displayed. Screen 120 displays a list of properties compiled within the database listed alphabetically. In FIG. 12, the user has clicked on section 121 to add a new property and causing pop-up screen 131 (FIG. 13) to be displayed. Here the user may enter detailed information regarding the new property.

Figure 14:
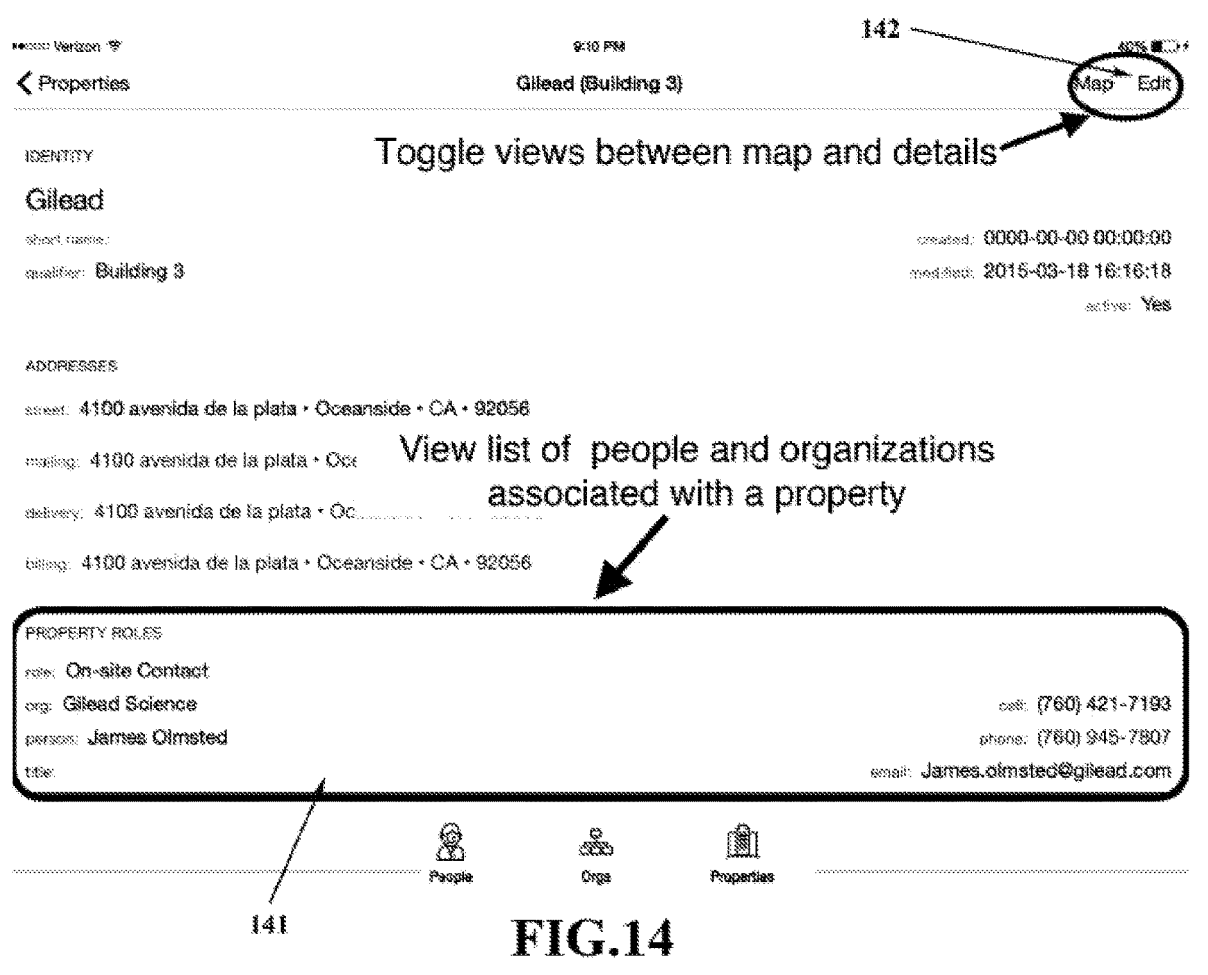

In FIG. 14 the user has selected the property Gilead from the list of properties shown in FIG. 12. More detailed information can be viewed in section 141 and edited by clicking on button 142.

Mapping

Figure 15:
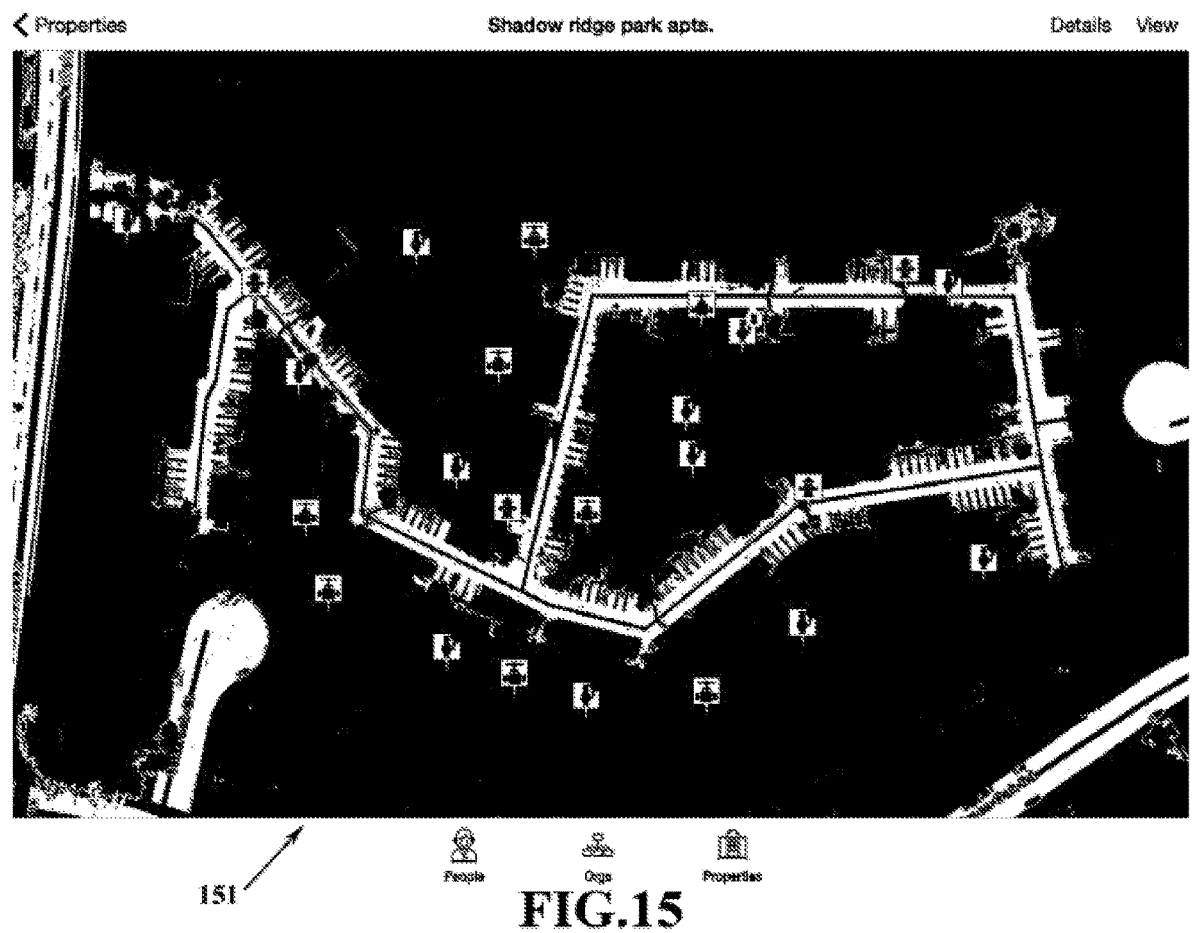
FIGS. 15-24 show preferred screens for mapping.

In FIG. 15, the user has clicked on the Shadow Ridge Park Apartments icon after scrolling down the property list shown in FIG. 12. FIG. 15 depicts aerial photographic image 151 of Shadow Ridge Park Apartments. Icons representing fire safety equipment are superimposed on top of image 151. The user can click on any icon to learn more about the safety equipment represented.

Figure 16:
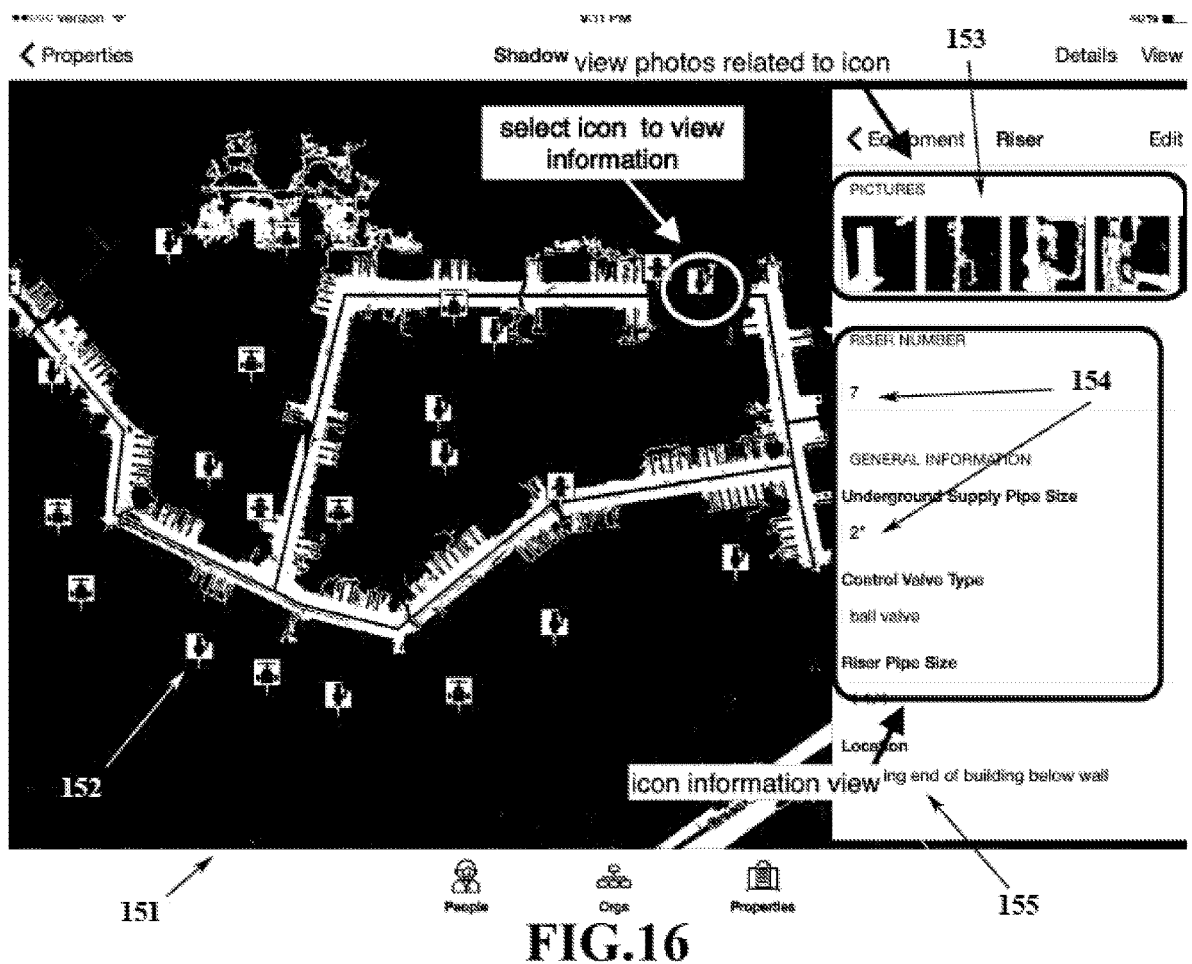

For example, in FIG. 16 the user has clicked on icon 152 depicting a riser located at the position shown on image 151. Photographs showing the riser are then depicted at pop-up screen 153, descriptive information regarding the riser/equipment is shown at pop-up screen 154, and location information regarding the riser is given at pop-up screen 155. In a preferred embodiment, pop-up screens 154 and 155 can be consolidated to show all information regarding the risers.

Figure 17:
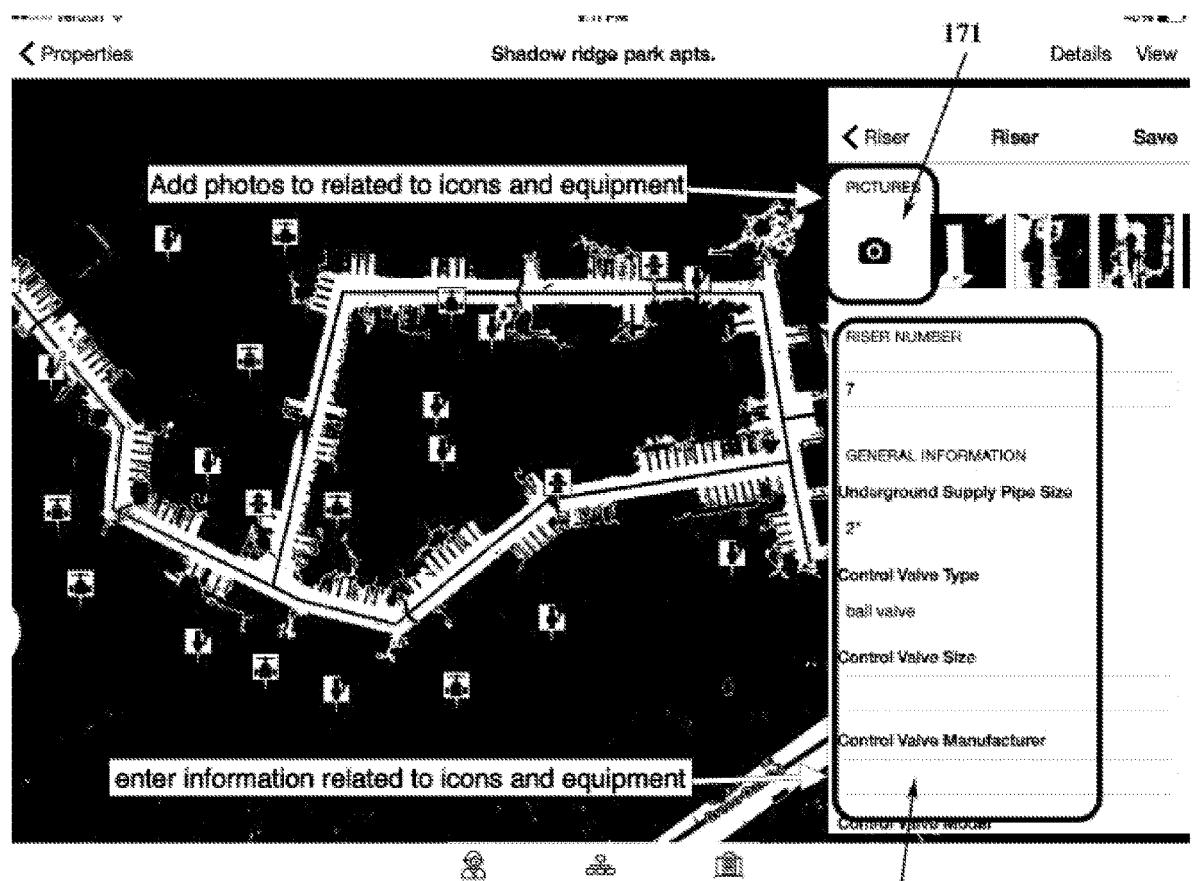
Figure 18:
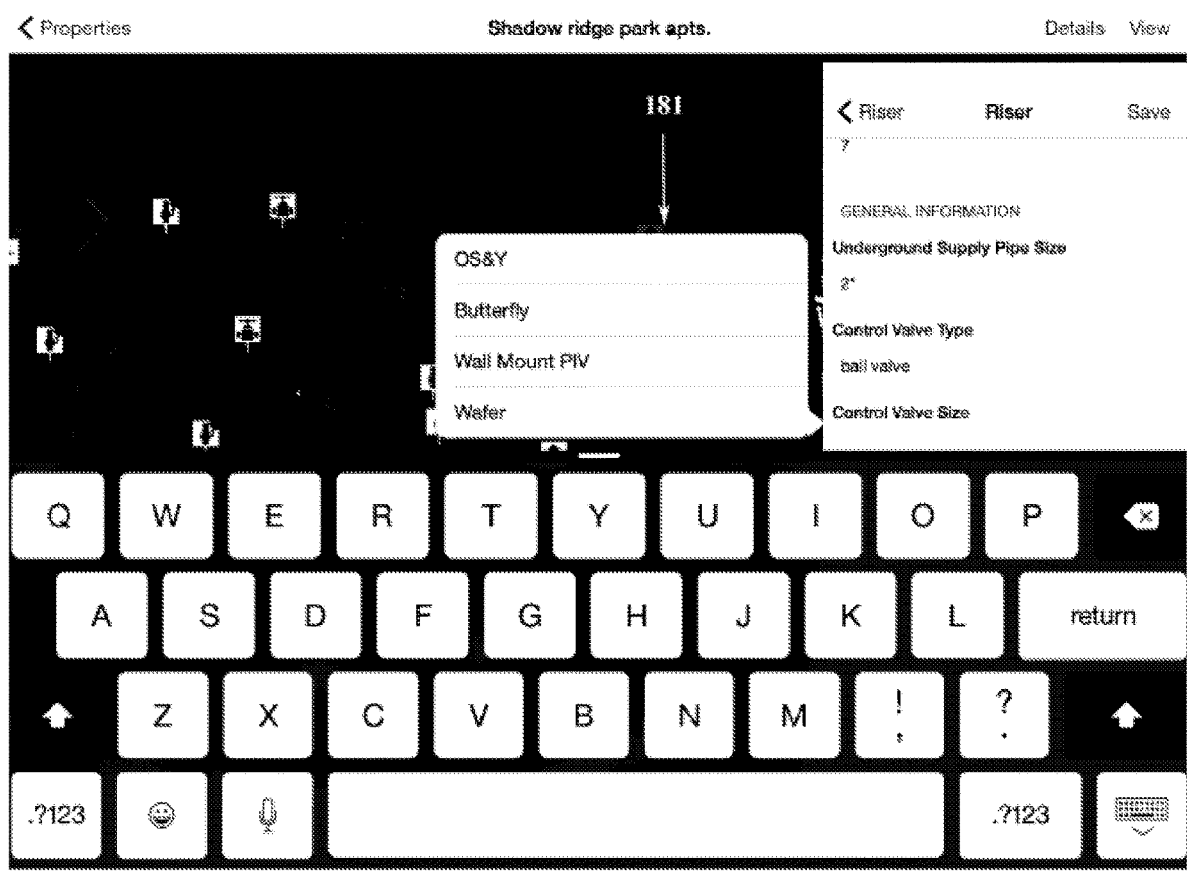
Figure 19:
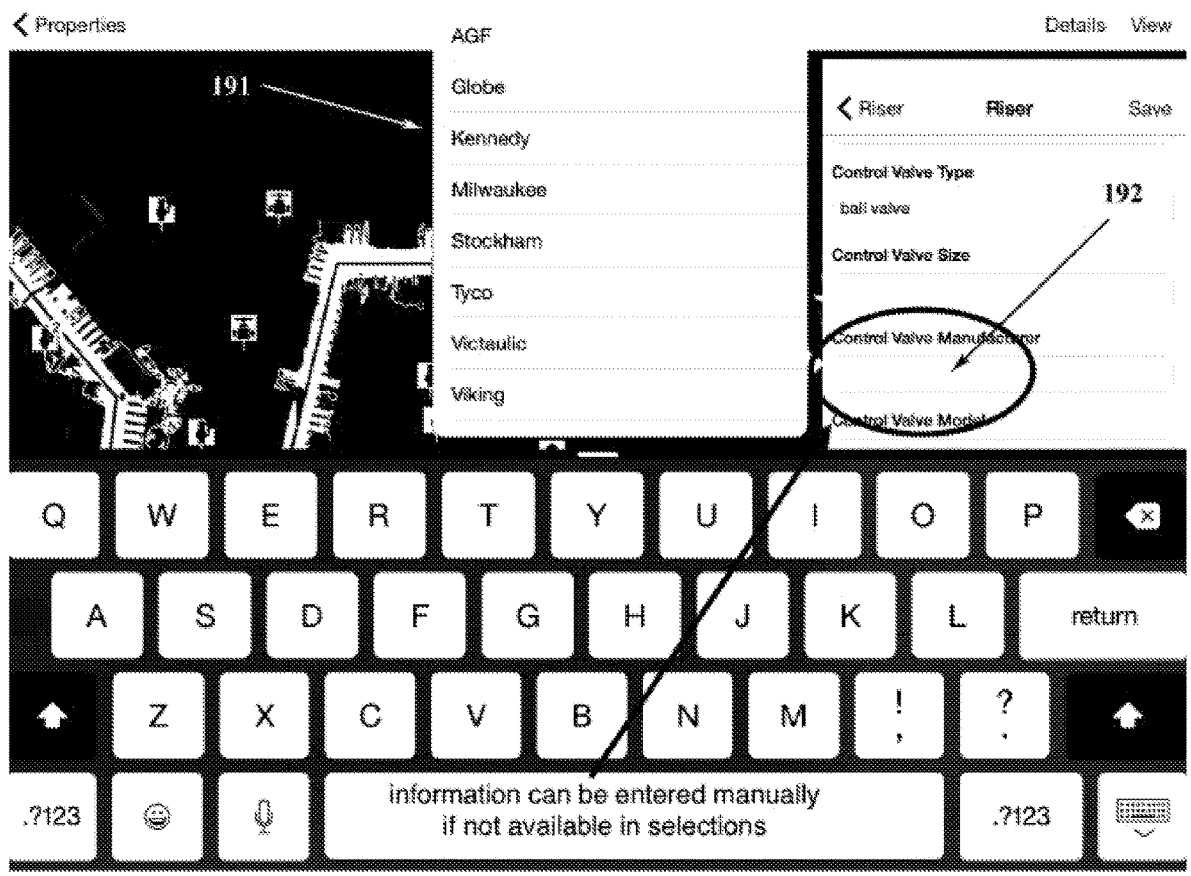

In FIG. 17, the user can click on section 171 to add additional photographs regarding the riser/equipment or he can click on section 172 to add additional information regarding the riser/equipment. For example, after clicking on section 172 pop-up selections 181 for the control valve appear as shown in FIG. 18. In FIG. 19, the additional information may be typed in manually in section 192 if selection list 191 does not include the desired information.

Figure 20:
Figure 21:

FIGS. 20 and 21 depict detailed photographic images of the riser. The user may view these pictures by clicking on the desired image shown in pop-up screen 153 (FIG. 16).

Figure 22:
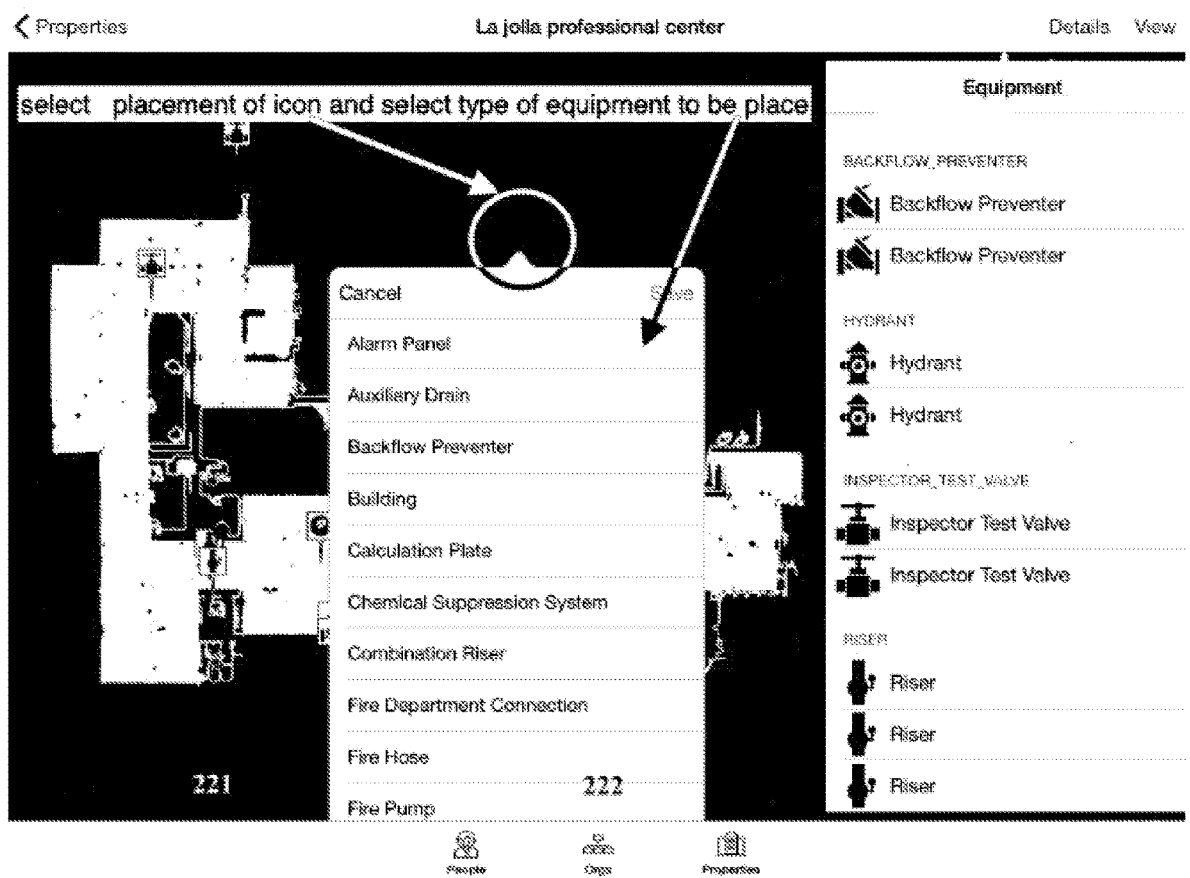
Figure 23:
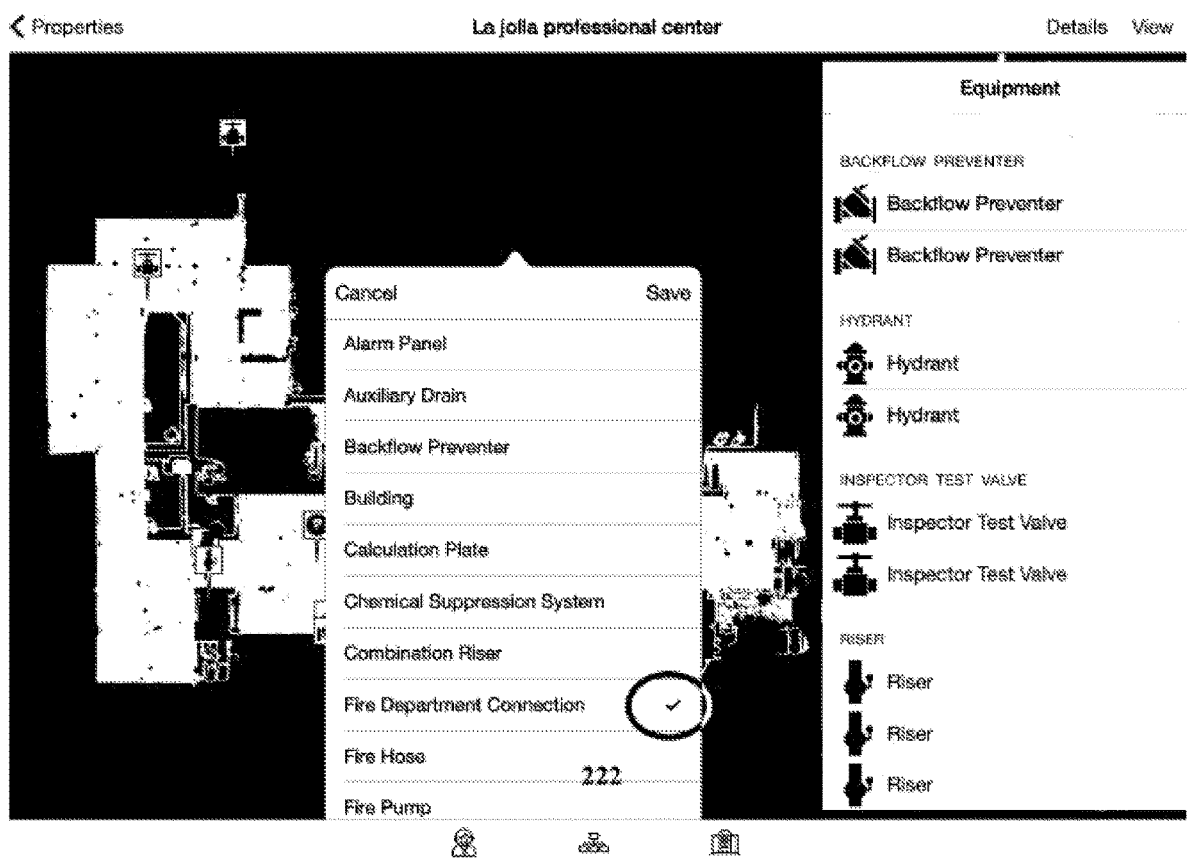
Figure 24:
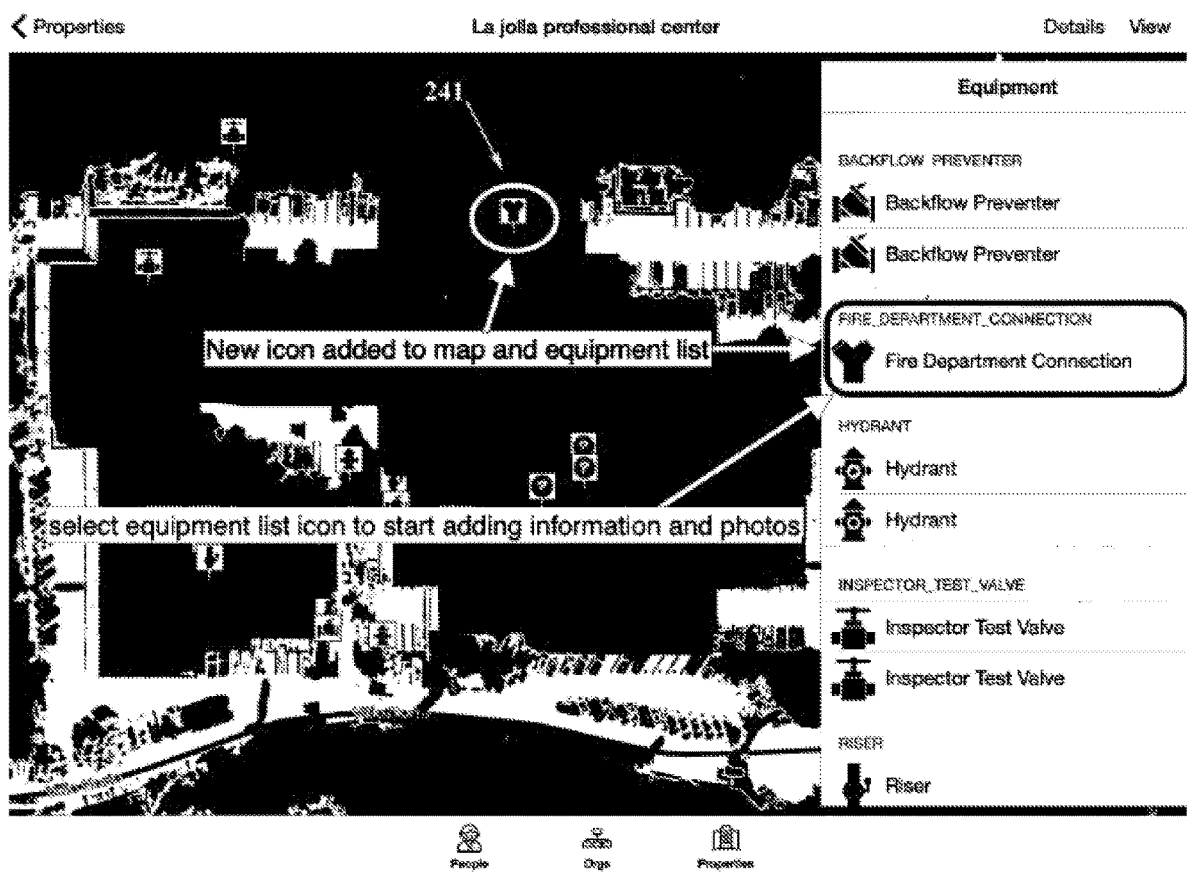

In FIG. 22 the user wants to add another icon to image 151. He first selects the location by clicking on the appropriate spot on image 151 (FIG. 16) and the selects the type of equipment represented by the icon be clicking on selection list 222. For example in FIG. 23 the user has selected Fire Department Connection from list 222. The icon is then presented as icon 241 (FIG. 24). The user can then click on the icon to add information and photos in a fashion similar to that described above.

Inspections of Fire Safety Equipment

The inspector is able to view fire safety equipment information that includes the make, model, size, manufacture and other pertinent information. This information relates to identifying icons, including photos, verbal identification/descriptions of locations, dates for inspections and equipment with its expiration date. Reminders are automatically created, calendars are populated and flags are raised to indicate problems or inspection due dates.

Fire safety equipment includes (but is not limited to): underground systems and components, backflows and control valves, all types of fire sprinkler systems and components, all types of standpipes systems and components, all types of fire pump systems and components, all types of fire tank systems and components, all types of chemical suppression systems and components, all types of kitchen hood systems and components, all types of fire extinguishers and components, all types of alarm systems and components, identification and location of all emergency shutoffs, hazards, Knox boxes and building access information. This list is not all inclusive. There are also many other types of fire safety equipment that may be inspected.

All equipment icons have information involving inspection requirements and frequencies. As inspections are assigned the inspection process will be completed through icon selection as it is located on map or floor levels. Also, as the inspection is completed, the information regarding the inspection is recorded and required paperwork is filled out. Deficiency lists with photos, providing accurate material lists and the locations for outstanding repairs is also compiled.

The deficiency lists are archived showing outstanding and completed repairs. A history of each item is kept showing date found, who found it, date repaired, by who and/or the inspector confirming the repair is completed. This information helps provide budgets, outstanding repair cost totals, equipment history for identifying reoccurring problems, information for fire prevention and insurance inspectors.

Equipment out of compliance, not working properly, or shut down will instantly show on icons for fire departments and managing organizations. This will enable emergency response teams to be informed of problems before arrival.

Figure 25:
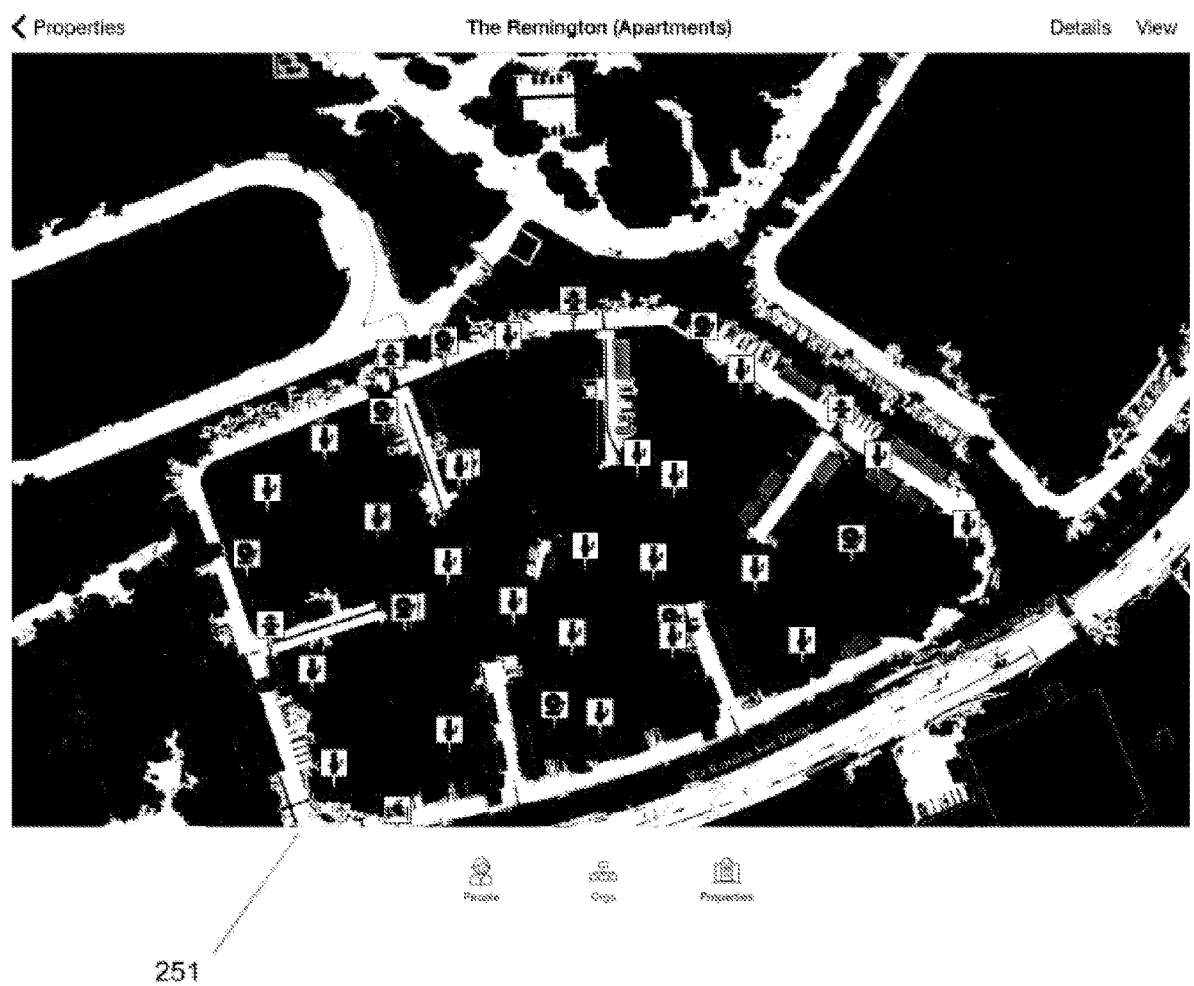
FIGS. 25-26 show preferred screens for fire safety inspection.
Figure 26:
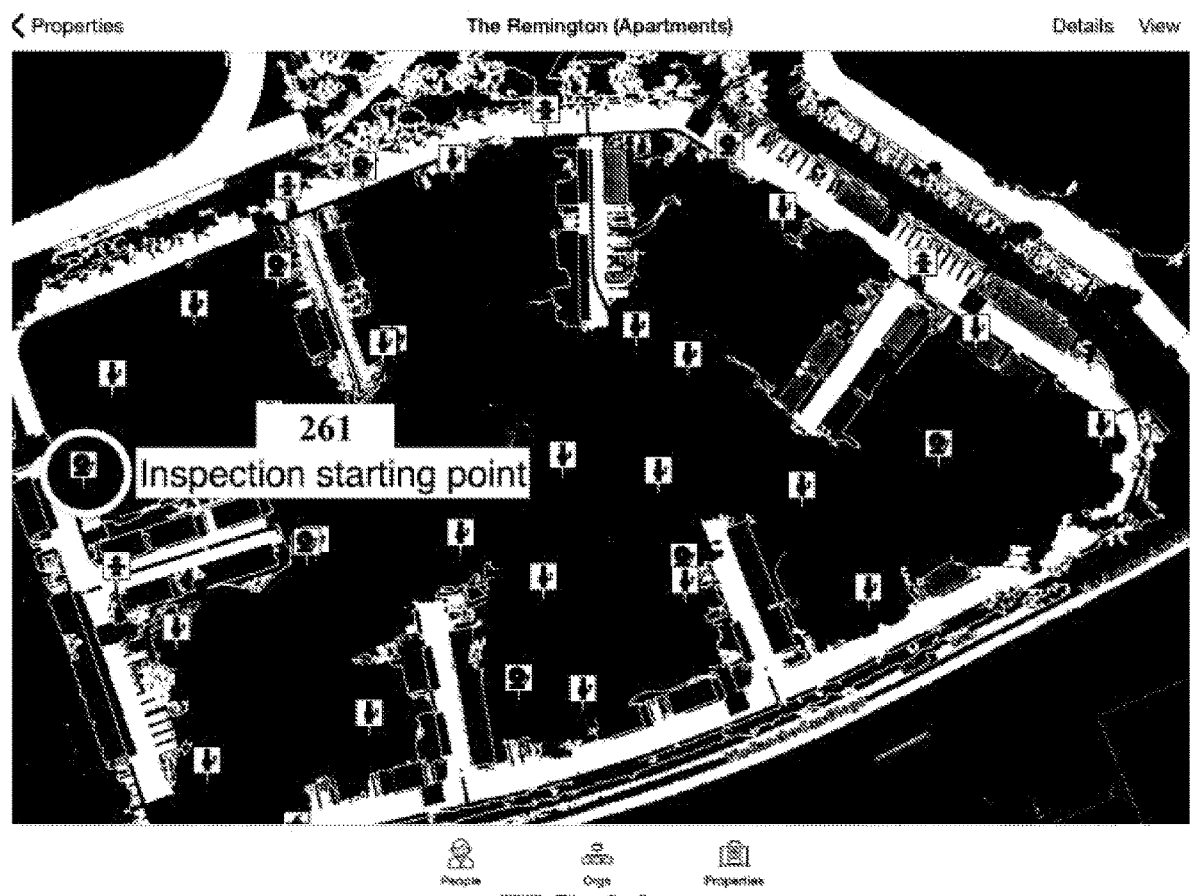

In a preferred embodiment an inspector is assigned an inspection job. Upon arrival the inspector will select the job information to take him to the property map. For example, FIG. 25 depicts aerial photographic image 251 of The Remington (Apartments). In FIG. 26 the inspector begins the inspection and clicks on the inspection starting point icon 261. GPS will identify proximity and allow inspector to start inspection. As the inspector is conducting the inspection, he can click on appropriate equipment icons to view pertinent inspection questions related to the type of device and inspection. Then, the inspector will complete prompted tasks and designated paperwork. Timestamp and date, along with inspector's identification number are applied to each completed item. In a preferred embodiment, floor level maps are used to create deficiency maps that identify locations of deficient items and tabulate material totals using existing equipment information (see FIGS. 27 and 28). Upon completion of inspection at each icon, app 341 will designate next required inspection area providing most efficient path of inspection. Once entire inspection is complete, deficiency list and NFPA paperwork is auto populated and sent to sales and posted for customer views. Billing is notified of completed inspection.

Photos, Video and Sound

Photos, Video and Sound are used throughout app 341 to identify: building identity, equipment, locations, deficiencies, problem areas, test procedures and results. Photos, Video and Sound are archived with the related information. Notes and identifying marks are addable to photos to more accurately point out specific items and locations.

Maps and Floor Plans

Property maps, floor plans, construction plans and exit plans are all used to map individual floors. Floor level maps are used for mapping equipment and identifying deficiency locations.

Web Administration

Web administrators preferably utilize a web browser to view programming and information in the database. In a preferred embodiment, a web administrator (FIG. 33) can access the database through the Internet using a variety of computing devices, including a laptop or desktop computer. The Web administrator can edit and update the database as appropriate and establish a Customer Relationship Management System (CRM). Previously input information of people, addresses, organizations and properties can be reorganized and related to each other. Database information can be used to create reports for: equipment information and listings, property reports, inspection reports, due date reports, zip codes, organization property listings, deficiency lists, outstanding repairs, water departments, and fire departments.

Also, database maps and information can also be used to schedule and organize inspections and repairs in larger tenant facilities. For example, the following features are available: web based scheduling utilizing existing building and floor maps with color coding to designate time slots, web link to schedule can be sent out by management allowing tenants to check in and view inspection times for their suite, and suite and unit numbers can also be used to set up check ins and time slots.

Preferably, there are three different views depending upon the identity of the web administrator. For example, web administrators for secondary customers 96 utilize a "Customer View" for web administration.

Customer View

The Customer View is nontransferable and non-modifiable. From the Customer View the administrator can: schedule dates and a calendar with upcoming events, inspections & repairs; schedule and time listings for upcoming work (tenants suites and units); review inspection reports (archive & real time reports)—one year current, open work records (with links to proposals); prepare annual budgets and conduct forecasting; review past and present invoices; and complete repair history and notes.

In a preferred embodiment the inspection reports has a basic printable report listing that only shows deficiencies and a non-transferrable or printable location guide.

Company View

Web administrators for Fire Inspection/Repair and Monitoring Companies 97 utilize a "Company View" for web administration. From the Company View the web administrator can: create and maintain building and customer info (all files to be found by address or customer name, larger customers/National Accounts by store/identifying numbers); use all CRM abilities, reports and information views; utilize maps & existing plans (one master copy & one notes copy for problem and note identifications, master to be duplicated for separate job/inspection folders to create job scopes and inspection repair locations, and GPS mapping & identifications); create and maintain inspection & service reports; create and maintain individual to do lists; and create and maintain employee profiles listing pertinent information (such as skills, badges and passes, specific training, particular equipment on trucks).

Fire Department View

Web Administrators for the fire department 98 utilize a "Fire Department View" for web administration. From the Fire Department View the web administrator can: review updates, notifications and search capabilities for building inspection dates; review repair progress on specific projects, have access to inspection reports and outstanding deficiency lists, receive real time notifications for systems out of service and emergency repair status.

Reports and Deficiency Lists

Figure 27:
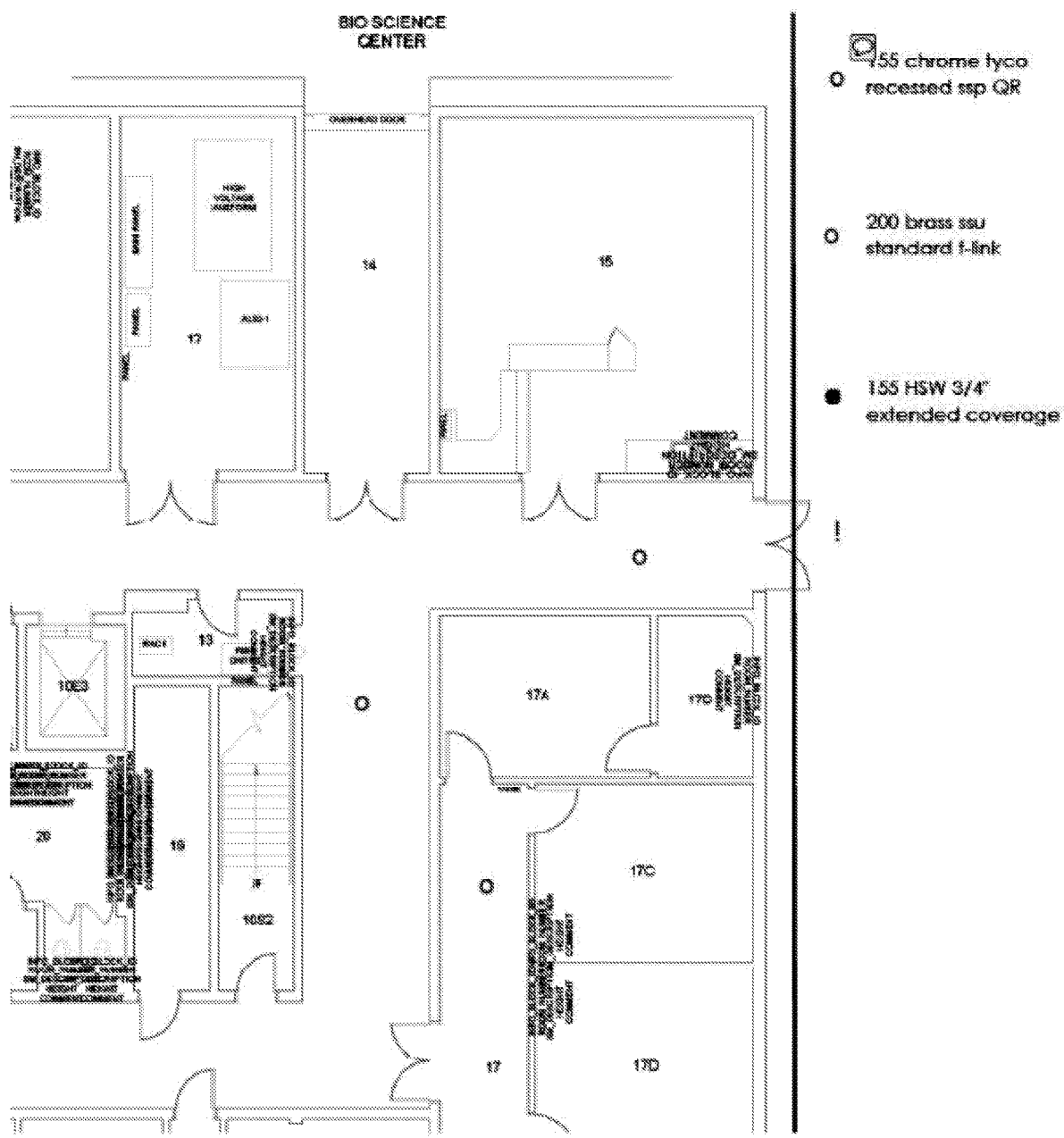
FIGS. 27-28 show floor maps showing inspection discrepancies.
Figure 28:
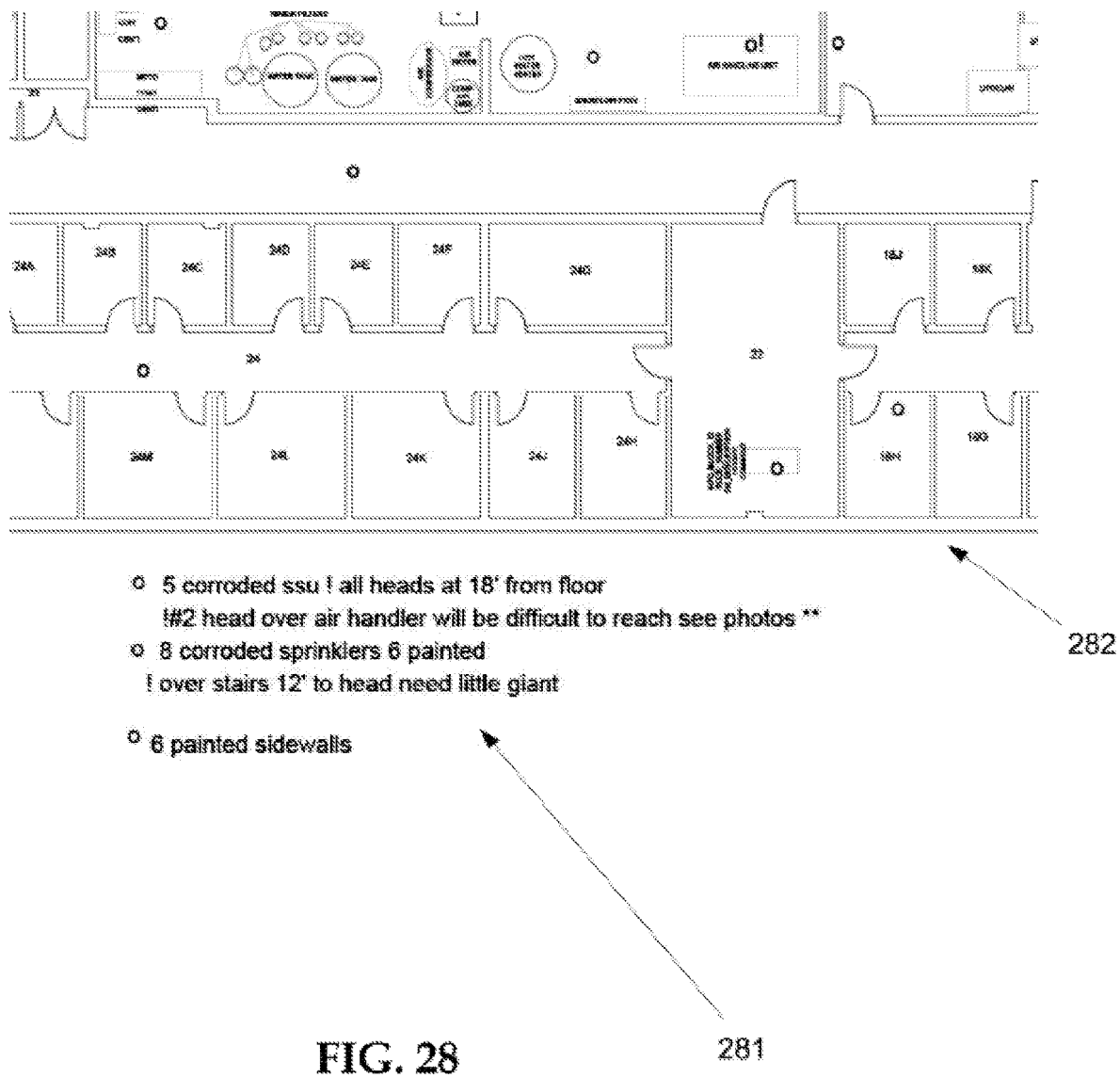

After the inspector has completed his inspection, partial and completed inspection reports are posted to the profile (FIGS. 27 and 28). Daily reports are auto populated with information from the inspection/repair that was completed that day. Inspection reports may then be reviewed with the customer associated with the property. Instant notifications are given to the customer, sales and billing departments when work is completed. In a preferred embodiment a repair proposal outlining the recommended and required repairs is sent to the customer for his consideration (FIG. 28). Once repairs commence, in a preferred embodiment, deficiency lists are archived showing outstanding and completed repairs. A history of each item will be kept showing date found, who found it, date repaired, by who and/or the inspector confirming the repair is completed. This information will help provide budgets, outstanding repair cost totals, equipment history for identifying reoccurring problems, information for fire prevention and insurance inspectors.

Sales

Sales specific proposals are customizable by each salesman. Pricing and labor hours are tabulated in conjunction with documents. There are multiple proposal templates to apply to onsite sales visits. Parts builder program with customizable part assembly drop downs and pricing are utilized (typical drops with head hanger and pipe). Parts list are auto generated (this also applies in the inspection process). Specific building information and sales points, as well as, local fire department information is utilized to help tabulate pricing. Auto send features for sending out proposals at a specific date and time to multiple contractors are also utilized. The sales process is used to track and create bid/to-do lists to track progress and sales participation.

In a preferred embodiment, using reports, floor maps and deficiency lists created during the inspection process, parts and pricing are automatically tabulated for sales to review and complete proposals. FIGS. 29-30 show a preferred proposal generated after the inspection is completed.

Pricing and labor hours are tabulated in conjunction with information gathered during job walks and sales review documents. Sales specific proposals are generated that are customizable by each salesman. Preferably, there are multiple proposal templates to apply to onsite sales visits that may be utilized to generate the proposals. Parts list are automatically generated (will also apply in the inspection process). Sold projects automatically create parts lists for ordering and staging to be dispatched when job is scheduled. Specific building information and sales points, as well as, local fire department information to help tabulate pricing are listed in the property page. There is also an auto send feature for automatically sending out proposals at a specific date and time to multiple contractors. Sales process can track and create bid "to-do" lists to track progress for project managers and superintendents and sales participation. "To-do" lists may be created to follow a repair project process by creating signature actions and assigned duties. As assignments are completed appropriate individuals are notified and additional follow on assignments are sent. Assignments will show on assignees "to-do" list until completed. All shown on progress report. In a preferred embodiment, plan tracing with highlighting is generated to track project progress. The percentage of completion is shown and matches.

Repairs

After the customer has accepted the proposal and has hired the repair company, repairs can commence. In a preferred embodiment, repairs follow a similar path as the inspections (see above discussion) using deficiency lists 281 and floor maps 282 (FIG. 28) to complete the repairs.

A repair technician is assigned the job (shown as a date and time) in his calendar. Upon arrival to the property requiring repair, the technician will select the job information. He will then be directed to the property map. The property information and scope of work will be shown. A deficiency list and repair locations will be shown. A start icon will prompt the technician where to start the repairs. As the technician completes his repairs he will enter the repair into his programmed handheld device. A timestamp and date, along with technician's identification number are applied to each completed item. Upon completion of repair at each icon or listed item the technician will be directed to the next required repair area providing the most efficient path of repair. Once all the repairs are complete, the completed deficiency list and corrected NFPA paperwork is auto populated and posted for customer views. Also, billing is notified of completed work.

Billing and Operations

In a preferred embodiment of the present invention, the billing section is compatible with commonly used other billing software programs. The billing section provides reports and documents that are easy to enter or transfer into other billing programs. As jobs are completed, billing is automatically notified. Billing files and a billing history is automatically kept for future reference. The billing history files may be accessed by searching for a property address, a relation to property, a person or organization.

Fire Department Site Plan

In a preferred embodiment, a fire department site plan provides fire departments with vital information for both emergency response and preventative fire crews. The utilization of the fire department site plan allows fire response crews to prepare for emergencies. Also, it gives preventative inspectors more insight into a property's condition. It provides readily accessible reports and tracking tools.

The site plan provides fire emergency response teams with up to date maps of equipment and their condition. The fire departments can review and be educated on details of a property in route to fire emergencies.

Fire departments have improved information and up to date reports of the property for inspections. Also, fire marshals are able to view the sites and manage and direct trucks, personnel, and equipment, from a tablet or desktop computer during an exercise or an actual fire emergency.

Figure 31:
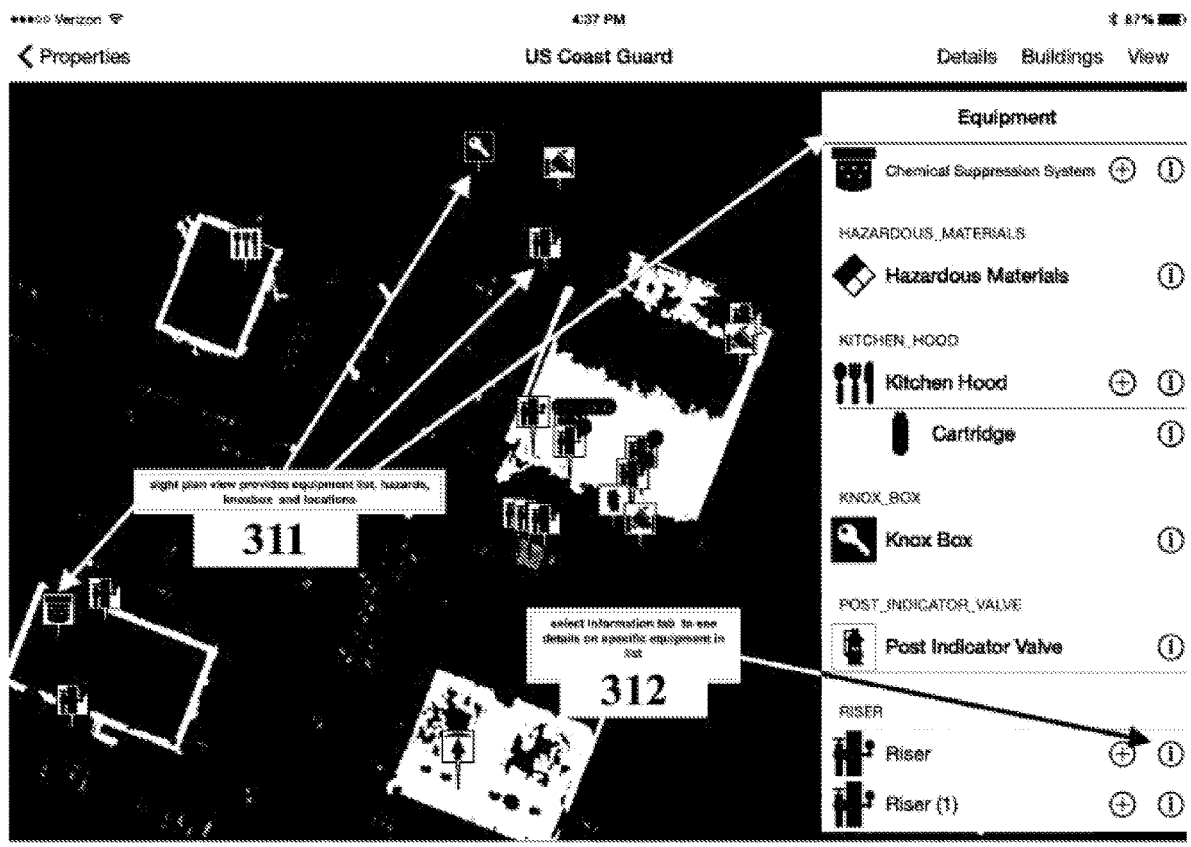
FIGS. 31-32 show a preferred fire department view.
Figure 32:
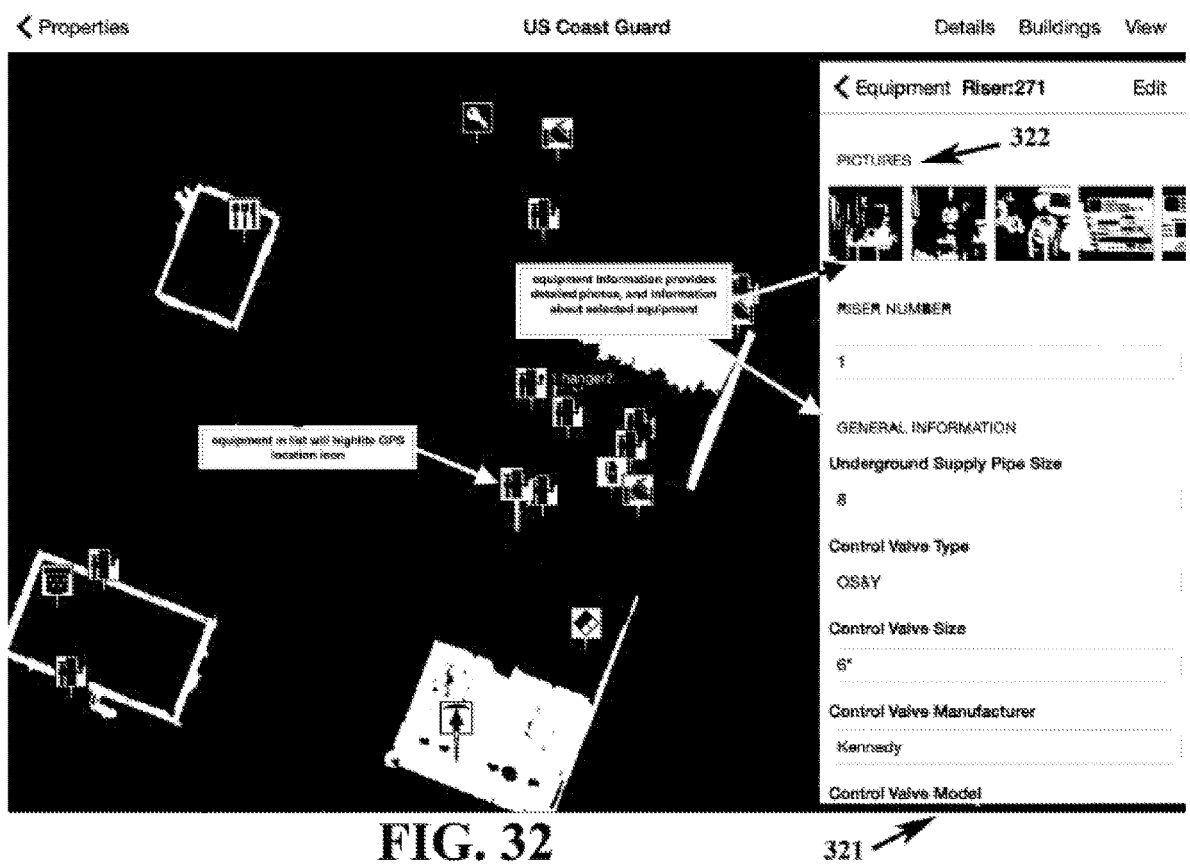

For example, FIG. 31 shows fire department site plan 311 for a US Coast Guard building. The user can view a listing of equipment located at the US Coast Guard building by viewing section 312. To view the specific location of the equipment the user looks at the location of icons superimposed over the map at site plan 311. The GPS coordinates for each icon are recorded and are accessible to assist in ease of equipment identification and location. To access detailed information about the equipment, the user can click on the icons on the map or he can click on the icons shown in section 312. For example, in FIG. 32 the user has clicked on the icon representing riser 271 to view detailed information regarding the riser in list 321. Photographic images of riser 271 can be viewed by clicking on thumbnail images shown in section 322.

The map views (FIGS. 31 and 32) provide up to date equipment views and locations. The views identify special hazards, gas and electrical information as well as access and key locations. The views provide access to property information, such as contacts, owners, subcontractors. Furthermore, up to date information is provided for the operational readiness of fire equipment. The map views may be used as a management tool to allow managers to direct man power, trucks and equipment remotely as well as on site. By utilizing site plan 311, local departments can preplan and map properties of special interest.

In a preferred embodiment of the present invention, the fire department site plan may also be utilized for the following functions: view property maps and equipment; update or start new property pre-plans; view reports, deficiency lists, certifications, outstanding repair items, and inspection due dates; write up and sight deficient properties; track progress of deficient sights; set reminders and return dates; and start files and history reports for properties.

Although the above-preferred embodiments have been described with specificity, persons skilled in this art will recognize that many changes to the specific embodiments disclosed above could be made without departing from the spirit of the invention. Therefore, the attached claims and their legal equivalents should determine the scope of the invention.

What is claimed is:

1. A system for mapping, documenting, monitoring, testing, inspecting, and maintaining fire safety equipment located at customer properties, comprising:
    A. at least one server computer accessible via a computer network, said at least one server computer programmed to receive status data and information regarding fire equipment belonging to secondary customers, said secondary customers comprising:
        i. people,
        ii. organizations, and
        iii. properties,
    B. at least one secondary customer computers having an Internet connection to said at least one server computer, said secondary customer computer being programmed to:
        a. receive data and information regarding the status of said fire safety equipment from said server computer, and
        b. receive analysis and recommendations,
    C. a plurality of primary customer computers connected via the Internet to said server computer, said plurality of primary customer computers being programmed to:
        a. transmit to said server computer data and information regarding the status of said fire safety equipment,
        b. receive data and information regarding the status of said fire safety equipment from said server computer,
        c. automatically populate calendars and raise flags to indicate problems or inspection due dates, and
        d. transmit analysis and recommendations to said secondary customer computer,
    D. an input computer for allowing a human operator to input Global Positioning System (GPS) data representing a physical location of fire equipment, and for identifying proximity of human operator to equipment, allowing the human operator to input test results data on proximate fire equipment, wherein said GPS data and said test results data is accessible to said secondary customer computer and said plurality of primary customer computers,
    E. at least one map comprising satellite images, said map showing said properties and associated fire equipment, wherein said properties and associated fire equipment including at least the make, model, size, and manufacture, are mapped onto said map via said Global Positioning System (GPS) input so as to show locations of said fire equipment at said properties on said at least one map, calculate paths to equipment, so a primary customer is able to:
  a. monitor the status of fire equipment,
  b. determine the location of fire equipment,
  c. start inspections,
  d. review inspection results of fire equipment,
  e. determine operational readiness of fire equipment, and
  f. manage and direct a fire response team during an exercise or emergency,
F. said server computer comprising data loaded onto said server computer, wherein said data facilitates said communication between said at least one secondary customer computer and said plurality of primary customers, said system further comprising programming allowing primary customers to associate secondary customers with said properties and said organizations, said system further comprising programming allowing primary customers to associate properties with related people and related organizations, said system further comprising programming allowing primary customers to associate organizations with related properties and related people,
G. programming allowing a fire service company to:
  a. monitor the status of fire equipment,
  b. determine the location of fire equipment,
  c. identify and present the most efficient path of inspection for inspectors to follow,
  d. record inspection results of fire equipment,
  e. timestamp results recorded with inspector identification,
  f. verify timestamping with human operator GPS coordinates,
  g. create and auto-populate deficiency list,
  h. submit proposal of repairs of fire equipment including at least one or more of photos, video and sound, the photos adaptable to receive marks and identifying notes,
  i. record repair results of fire equipment, and
  j. submit invoicing regarding said repairs/inspections of fire equipment,
H. programming allowing firefighters to:
  a. call up fire department site plans from which fire response crews can prepare for emergencies,
  b. call up real time data maps of fire equipment and fire equipment condition for review and to be educated on details of a property in route to fire emergencies and direct trucks, personnel, and equipment, and
  c. receive via icons information about fire equipment out of compliance, not working properly, or shut down,
I. programming allowing customers and service entities to view nontransferable and non-modifiable property maps, said maps comprising icons representing the location of fire equipment, select said icons to access information regarding fire equipment, and select said icons to input updated information regarding fire equipment,
J. programming allowing paperwork auto population:
  a. receive data that inspection is complete,
  b. determine deficiency list,
  c. auto populate National Fire Protection Association paperwork,
  d. post the National Fire Protection Association paperwork for viewing,
  e. notify a billing system of completed inspection, and
  f. archive completed repairs showing date deficiency found, who found it, date repaired, and by who confirmed the repair is completed,
K. a Customer Relationship Management database adapted to relate to each other at least people, addresses, organizations and properties, the database adapted to create reports for at least one or more of: equipment information and listings, property reports, inspection reports, due date reports, zip codes, organization property listings, deficiency lists, outstanding repairs, water departments, and fire departments, and
L. a sales tracker adapted to create bid/to-do lists and track progress and sales participation for at least fire safety equipment and services, parts, labor, and pricing automatically tabulated for review, completing proposals, and billing.

2. The system as in claim 1, wherein said secondary customer computer and said plurality of primary customers comprises at least one mobile device.

3. The system as in claim 1, wherein said system further comprises programming:
  a. allowing primary customers to associate properties with related people and related organizations,
  b. allowing primary customers to associate secondary customers with said properties and said organizations, and
  c. allowing primary customers to associate organizations with related properties and related people.

4. The system as in claim 1, wherein said plurality of primary customer computer further comprises at least one fire inspection/repair computer operated by a fire service company and a fire department computer operated by a fire department.

5. The system as in claim 1, wherein said at least one server computer further comprises a shared database shared between secondary customers and primary customers, said shared database comprising information regarding fire equipment.

6. A system for mapping, documenting, monitoring, testing, inspecting, and maintaining fire safety equipment located at, customer properties, comprising:
  A. at least one server computer accessible via a computer network, said at least one server computer programmed to receive status data and information regarding fire equipment belonging to secondary customers, said secondary customers comprising:
    a. people,
    b. organizations, and
    c. properties, said at least one server computer comprising programming:
      i. allowing primary customers to associate properties with related people and related organizations,
      ii. allowing primary customers to associate secondary customers with said properties and said organizations,
      iii. allowing primary customers to associate organizations with related properties and related people, and
      iv. establishing a shared database allowing primary customers and secondary customers to access said shared database to have access to information regarding fire equipment status, B. at least one secondary customer computers having an Internet connection to said at least one server computer, said secondary customer computer being programmed to:
   a. receive data and information regarding fire safety equipment status from said at least one server computer,
   b. receive analysis and recommendations, and
C. a plurality of primary customer computers connected via the Internet to said at least one server computer, said plurality of primary customer computers being programmed to:
   a. transmit to server computer data and information regarding fire safety equipment status,
   b. receive data and information regarding the status of said fire safety equipment including at least the make, model, size, and manufacture, from said server computer,
   c. automatically populate calendars and raise flags to indicate problems or inspection due dates,
   d. receive at least one or more of photos, video, and sound, the photos adaptable to receive marks and identifying notes, and
   e. transmit analysis and recommendations to said secondary customer computer, wherein said plurality of primary customer computers further comprises at least one fire inspection/repair computer operated by a fire service company and a fire department computer operated by a fire department, wherein said plurality of primary customer computer further comprises programming allowing a fire service company to:
      i. monitor fire equipment status,
      ii. determine fire equipment location,
      iii. identify and present the most efficient path of inspection for inspectors to follow,
      iv. record fire equipment inspection results,
      v. timestamp results,
      vi. verify timestamping with human operator GPS coordinates,
      vii. create and auto-populate deficiency list,
      viii. submit proposal of repairs of fire equipment,
      vix. record fire equipment repair results, and
      x. submit invoicing regarding repair/and inspections of fire equipment,
D. an input computer for allowing a human operator to input Global Positioning System (GPS) data representing fire equipment location, for identifying proximity of human operator to equipment, and for allowing a human operator to input test results data on proximate fire equipment, wherein said GPS data and said test results data is accessible to said secondary customer computer and said plurality of primary customer computers,
E. at least one map comprising satellite images, said at least one map showing said properties and said fire equipment, wherein said properties and said fire equipment are mapped onto said map via said Global Positioning System (GPS) input so as to show locations of said fire equipment at said properties on said at least one map, calculate paths to equipment, so a primary customer is able to:
   a. monitor the status of fire equipment,
   b. determine the location of fire equipment,
   c. start inspections,
   d. review inspection results of fire equipment,
   e. determine operational readiness of fire equipment, and
   f. manage and direct a fire response team during an exercise or emergency,
F. said at least one server computer comprising data loaded onto said at least one server computer, wherein data facilitates and communication between said secondary customer computer and said plurality of primary customers, said secondary customer computer and said plurality of primary customers further comprising programming allowing primary customers to associate secondary customers with properties and organizations, said secondary customer computer and said plurality of primary customers further comprising programming allowing primary customers to associate properties with related people and related organizations, said secondary customer computer and said plurality of primary customers said system further comprising programming allowing primary customers to associate organizations with related properties and related people,
G. programming allowing customers and service entities to view nontransferable and non-modifiable property maps, and map icons representing the location of fire equipment, select icons to access information regarding fire equipment, and select icons to input updated information regarding fire equipment substantially immediately,
H. programming allowing paperwork auto population:
   a. receive data that inspection is complete,
   b. determine deficiency list,
   c. auto populate National Fire Protection Association paperwork,
   d. post the National Fire Protection Association paperwork for viewing,
   e. notify a billing system of completed inspection,
   f. archive completed repairs showing date deficiency found, who found it, date repaired, and by who confirmed the repair is completed,
I. a Customer Relationship Management System adapted to relate to each other at least people, addresses, organizations and properties, the database adapted to create reports for at least one or more of: equipment information and listings, property reports, inspection reports, due date reports, zip codes, organization property listings, deficiency lists, outstanding repairs, water departments, and fire departments, and
J. a sales tracker adapted to create bid/to-do lists and track progress and sales participation for at least fire safety equipment and services, parts, labor, and pricing automatically tabulated for review, completing proposals, and billing.

* * * * *